(12) United States Patent
Hirose et al.

(10) Patent No.: US 7,361,263 B2
(45) Date of Patent: Apr. 22, 2008

(54) WATER TREATMENT APPARATUS AND METHOD

(75) Inventors: Jun Hirose, Hirakata (JP); Fumitake Kondo, Otsu (JP); Naoki Hiro, Osaka (JP); Kouichi Sano, Osaka (JP); Takashi Nakano, Takatsuki (JP); Hiroshi Takenaka, Takatsuki (JP); Yoko Ando, Takatsuki (JP); Toyohide Kobayashi, Takatsuki (JP)

(73) Assignees: Sanyo Electric Co., Ltd., Moriguchi-Shi (JP); School Legal Corporation, Osaka Medical College, Takatsuki-Shi (JP)

( * ) Notice: Subject to any disclaimer, the term of this patent is extended or adjusted under 35 U.S.C. 154(b) by 714 days.

(21) Appl. No.: 10/724,881

(22) Filed: Dec. 2, 2003

(65) Prior Publication Data

US 2004/0154995 A1    Aug. 12, 2004

(30) Foreign Application Priority Data

Dec. 3, 2002    (JP)    ............................. 2002-351751

(51) Int. Cl.
*C02F 1/461*    (2006.01)
(52) U.S. Cl. ..................... 205/687; 205/688; 205/742
(58) Field of Classification Search ................ 205/687, 205/688, 742; 204/275.1
See application file for complete search history.

(56) References Cited

U.S. PATENT DOCUMENTS 5,798,028 A * 8/1998 Tsuchikawa et al. ..... 205/228.2

5,858,202 A * 1/1999 Nakamura .................. 205/746
6,126,810 A   10/2000 Fricker et al.
6,375,827 B1   4/2002 Kurosu et al.
6,475,371 B1 * 11/2002 Shirahata et al. ........... 205/742

FOREIGN PATENT DOCUMENTS

| EP | 0 849 227 A2 | 6/1998 |
| EP | 1 074 515 A2 | 2/2001 |
| JP | 5-302706 A | 11/1993 |
| JP | 7-313584 A | 12/1995 |
| JP | 2001-62437 A | 3/2001 |

OTHER PUBLICATIONS

Isao Shibasaki, "Supervision Techniques of Hazardous Microbes vol. 2", Fuji Techno System, May 2000, pp. 733-738 (Japanese language), pp. 1-6 (English translation).

* cited by examiner

*Primary Examiner*—Arun S. Phasge
(74) *Attorney, Agent, or Firm*—Foley & Lardner LLP

(57) ABSTRACT

A water treatment apparatus includes a storage unit storing water to be treated including a pharmaceutical drug, an apply unit applying the water to be treated to the storage unit, an addition unit adding into the water to be treated metal salt generating halide ions when dissolved in the water to be treated, and an energizing unit applying a current to a pair of electrodes immersed in the water to be treated in the storage unit. The pharmacological activity of the pharmaceutical drug is eliminated or reduced by decomposing or altering at least a portion of the chemical structure of the pharmaceutical drug included in the water to be treated through electrolysis.

5 Claims, 14 Drawing Sheets

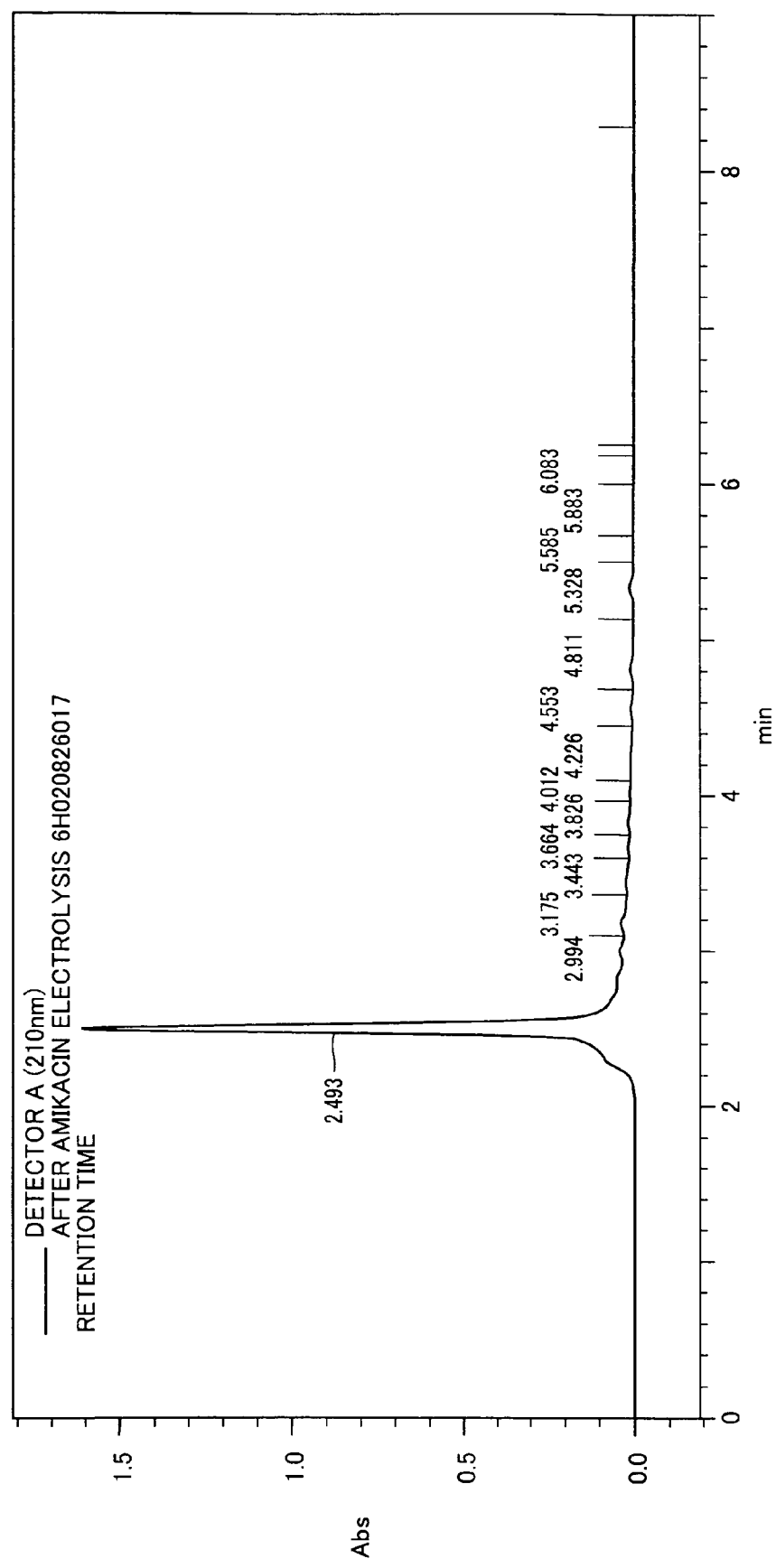

WATER TREATMENT APPARATUS AND METHOD

BACKGROUND OF THE INVENTION

1. Field of the Invention

The present invention relates to a method of treating waste water discharged from medical facilities. More specifically, the present invention relates to an apparatus and method of treating pharmaceutical drugs included in waste water by means of electrolysis to the extent that the pharmacological activity and toxicity thereof are eliminated or reduced to an acceptable level.

2. Description of the Background Art

Nature including the river and ocean is affected in one way or another by the activities of humans. Usage of water supplied from rivers and oceans as well as sewerage releasing used water back to the rivers are critical factors in the environment. As to the issue of sewerage, the used water output from households, companies, plants and the like, i.e. waste water, should be restored as close as possible to the former state before being dispatched back to the rivers and oceans for environmental reasons. As such, various public and governmental regulations have been established. Presently, particular types of waste water are subjected to some treatment to a level so as not to effect the environment.

It is appreciated that waste water from hospitals and medical facilities is one of the factors of discharged hazardous substances. However, only those related to infectious waste are subject to the aforementioned regulations. Those related to noninfectious waste are just regulated as industrial waste under special supervision. In other words, there are some chemicals among noninfectious waste from hospitals and medical facilities that are released to the river without undergoing substantially any treatment. Such noninfectious waste includes harmful remnants such as injection needles and surgical knives as well as hazardous waste such as antiseptic solutions, antibiotics, antitumor agents and the like.

Such hazardous waste of antitumor agents, antiseptic solutions, antibiotics, and the like exhibit various properties of cytotoxicity, mutagenicity, teratogenicity and the like, killing biological organisms and bacteria as well as inducing damage on the gene level. If the waste is not treated to a level of eliminating or reducing the pharmacological activity before being discharged into the river, there is a possibility of the ecology and environment being adversely affected potentially.

Agents identified as such hazardous waste may not be metabolized in the human body, when applied to a human being, so that it will be excreted in the original form of the agent. No legal regulations are established at the current stage as to such agents included in excretion. The effect of such agents excreted from the human body on the ecological system and environment, when discharged to nature in an untreated form, is a matter of concern.

It is therefore necessary to apply some treatment on the waste fluid discharged from medical facilities to a level where the toxicity of the agent included in the waste is eliminated or reduced.

As to the current treatment of medical waste, mainly incineration is employed, as disclosed in Japanese Patent Laying-Open Nos. 2001-62437, 7-313584, 5-302706, and "Supervision Techniques of Hazardous Microbes", Volume II, pp. 733-735. An evaporation concentration incineration method disclosed therein will be described hereinafter. As shown in FIG. 18, this method is a combination of evaporation concentration and incineration. The method includes the steps of condensing the waste water by distillation to increase the concentration of the organic matter, approaching the calorific value of 10,500 kJ/kg corresponding to hypergolic waste water, and then incinerated together with another waste fluid.

The initial expense to introduce the equipment for this method as well as the running cost thereof are extremely high. This method is not preferable for economic reasons. Furthermore, considerable energy is required for incineration and evaporation, and the energy efficiency is poor. There is also a problem that the discharged amount of carbon dioxide is great.

Additionally, a pretreatment of condensing and the like is required prior to incineration. The efficiency from the standpoint of time is also poor since the waste fluid must be transported from the medical facility to the incineration facility. Furthermore, the cost for transportation will be incurred.

SUMMARY OF THE INVENTION

The present invention is directed to solve the environmental problems set forth above related to rivers and oceans. An object of the present invention is to provide an apparatus and method of treating, economically and with favorable efficiency in energy and time, waste water discharged from medical facilities such as hospitals to a level so as not to influence the ecology. More specifically, an object of the present invention is to provide an apparatus and method of treating a pharmaceutical drug included in waste water by decomposing or altering partially the structure of the pharmaceutical drug through electrolysis to render inactive the pharmaceutical drug, such that it will not affect the ecology and environment of rivers and the like.

According to an aspect of the present invention, a water treatment apparatus includes a storage unit for storing water to be treated including a pharmaceutical drug, an apply unit for applying the water to be treated into the storage unit, an addition unit for adding, into the water to be treated, metal salt that generates halide ions when dissolved in the water to be treated, and an energizing unit for applying current through a pair of electrodes immersed in the water to be treated in the storage unit.

In accordance with the present invention, waste fluid from a medical facility or the like is subjected to a treatment employing electrolysis, whereby the pharmaceutical drug in the waste fluid can be rendered inactive more efficiently from the standpoint of energy and economical aspects, as compared to the case of incineration carried out at an incineration facility. By treating the waste fluid in accordance with the water treatment apparatus and method of the present invention prior to the passage of the well-known sewerage for disposal, the adverse effect of the treated water on the environment, when discharged to the river or ocean, can be reduced.

Preferably, the apply unit includes an input valve through which the water to be treated flowing into the storage unit passes, and an output valve through which the water discharged from the storage unit passes.

Adjustment of the amount of waste fluid flowing into the storage unit by opening/closing the valves is advantageous in that manual contact with the waste fluid per se is eliminated. The treatment can be carried out arbitrarily without the substance in the waste fluid adversely affecting the human body.

Preferably, the water treatment apparatus of the present invention further includes a mixing unit for mixing the contents in the storage unit, and a separation unit for separating a solid from liquid in the storage unit.

By conducting electrolysis while mixing the contents in the storage unit by the mixing unit, the efficiency of electrolysis is improved. Also, the provision of the separation unit to separate the solid from liquid allows the precipitates and sludge generated by electrolysis to be effectively and reliably drawn away from the electrodes.

Preferably, the pair of electrodes is formed of a material including at least Pt.

Preferably, the water treatment apparatus of the present invention further includes a liquid level sensing unit for sensing the liquid level of the water to be treated in the storage unit. The liquid level sensing unit, energizing unit, and apply unit are under control of a control unit.

By providing a sensor sensing the liquid level under control of the control unit, the liquid level in the storage unit can be maintained at a predetermined level. Also, electrolysis can be conducted automatically for a predetermined period of time.

Preferably, the pharmaceutical drug is at least one of a sterilant, anticancer drug, and antibiotic.

A water treatment method of the present invention includes the step of decomposing or altering at least a portion of the chemical structure of a pharmaceutical drug included in water to be treated through electrolysis to eliminate or reduce the pharmacological activity of the pharmaceutical drug.

By treating the waste fluid from a medical facility or the like through electrolysis in accordance with the present invention, the pharmaceutical drug in the waste fluid can be rendered inactive more efficiently from the standpoint of energy and economical aspects, as compared to the conventional case of incineration at an incineration facility. By treating the waste fluid in accordance with the water treatment method of the present invention prior to the passage of the well-known sewerage for disposal, the adverse effect of the treated water on the environment, when discharged to the river or ocean, can be reduced.

A water treatment method of the present invention includes the steps of applying water to be treated including a pharmaceutical drug into a storage unit storing the water to be treated, adding into the water to be treated, metal salt generating halide ions when dissolved in the water to be treated, and applying current through a pair of electrodes immersed in the water to be treated in the storage unit for a predetermined period of time.

In accordance with the water treatment method of the present invention, the pharmacological activity of the pharmaceutical drug included in the waste fluid can be eliminated or reduced effectively.

Preferably, the water treatment method of the present invention controls the amount of water to be treated into the storage unit by controlling the opening/closing of an input valve through which the water to be treated flowing into the storage unit passes and an output valve through which the treated water to be discharged from the storage unit passes.

Adjustment of the amount of waste fluid flowing into the storage unit by opening/closing the valves is advantageous in that manual contact with the waste fluid per se is eliminated. The treatment can be carried out arbitrarily without the substance in the waste fluid adversely affecting the human body.

Preferably, the water treatment method of the present invention further includes the step of mixing the contents in the storage unit. By conducting electrolysis while mixing, the reaction efficiency is increased.

Preferably, the water treatment method of the present invention further includes a step of separating a solid from liquid in the storage unit. By removing the reaction product generated by electrolysis, when solid, deposition of solid precipitates in the storage unit can be prevented.

Preferably in the water treatment method of the present invention, the pair of electrodes is formed of a material including at least Pt. Also preferably, the waste fluid is waste fluid discharged from facilities handling pharmaceutical drugs.

Preferably in the water treatment method of the present invention, the pharmacological activity is at least one of bactericidal action, disinfection action, cytotoxicity, and mutagenicity. By eliminating or reducing such pharmacological activity, the influence to the ecology when discharged to the river and the like can be prevented.

Preferably in the water treatment method of the present invention, the metal salt is sodium chloride. The pharmaceutical drug is preferably any of a sterilant, anticancer drug, and antibiotic.

In accordance with the water treatment method of the present invention, waste fluid discharged from medical facilities including a sterilant, antibiotic, and anticancer drug is treated by electrolysis, whereby the pharmacological activity and/or toxicity of the agent can be eliminated or reduced. The waste fluid subjected to the water treatment method of the present invention is passed through the current sewerage system and then discharged to the river and ocean, whereby the order of the ecology and environment can be maintained. The water treatment method of the present invention is advantageous in that the processing apparatus can be made significantly smaller, as compared to the conventional waste treatment process such as through incineration. Also, since the energy required for the process is smaller than that required for incineration, the economical effect is great since the cost required for introducing the equipment and the running cost can be reduced. The present invention is absent of the output of toxic substances such as dioxin, NOx, SOx and $CO_2$, and provides a clean method of treatment from the standpoint of environmental aspects.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A and 8B are charts of high performance liquid chromatography on amikacin sulfate, wherein the former corresponds to zero hours after initiating electrolysis and the latter corresponds to six hours after initiating electrolysis.

DESCRIPTION OF THE PREFERRED EMBODIMENTS

Figure 1:
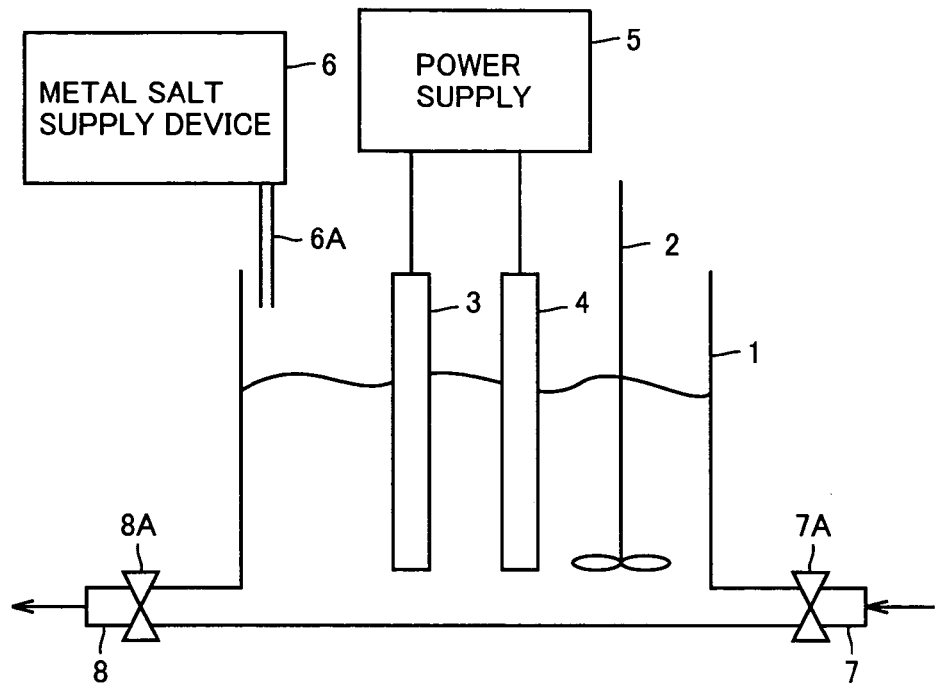
FIG. 1 is a schematic sectional view of a water treatment apparatus of the present invention.

The water treatment apparatus and method of the present invention is characterized in that at least a portion of the chemical structure of the pharmaceutical drug included in water to be treated is decomposed or altered through electrolysis to eliminate or reduce the pharmacological activity of the pharmaceutical drug.

In the present invention, the water to be treated that is the subject of treatment is waste fluid discharged from medical facilities, various research facilities, and medical-related facilities such as plants of medicine and food, including pharmaceutical drugs with the possibility of exhibiting chronic toxicity such as cytotoxicity, carcinogenicity, mutagenicity, teratogenicity, and spermotoxicity. The risk and harm of a hazardous pharmaceutical drug on humans and other lives as well as on the environment of organisms can be eliminated or reduced by the water treatment apparatus and method of the present invention.

Although the chemical mechanism of the pharmacological activity of a pharmaceutical drug being eliminated or reduced by electrolysis is not yet made clear in detail, it is considered that some chemical change has occurred in at least a portion of the chemical structure of the pharmaceutical drug. In the present invention, the expression of "alteration of at least a portion of the chemical structure" as used herein refers to at least a portion of an atom or an atomic group defining the chemical characteristic and property of the pharmaceutical drug, and that can contribute to the acting mechanism or that can exhibit activity at the acting site in homines or other organisms, being altered. Specifically, it is considered that at least a portion of the functional group constituting the chemical structure of the pharmaceutical drug is altered. The term "alteration" as used herein refers to all chemical, physical, and electrochemical changes. For example, it includes changes caused by chemical reaction that may occur in the pharmaceutical drug such as substitution, cyclization, addition, condensation, polymerization, oxidation, and reduction. Examples of a pharmaceutical drug included in the water to be treated include hazardous waste, specifically, sterilants, antibiotics, and anticancer drugs.

<Electrolysis>

In accordance with the water treatment apparatus and method of the present invention, the pharmacological activity and/or toxicity of the pharmaceutical drug having toxicity is rendered inactive through electrolysis. In the present invention, common means well known in the field of chemistry for electrolysis can be used. Electrolysis refers to passage of current through an ion conductor such as an electrolyte solution, fused electrolyte, and the like to cause chemical change. By applying electrical energy, a reaction of increase in free energy, absent in a general chemical reaction, can be established.

The electrolytic method of the present invention will be described schematically hereinafter. One pair of electrodes is inserted into the water to be treated. Both ends of the electrodes are connected to a power supply. Either direct current or altering current can be employed for the power supply. In the present invention, direct current power supply is preferably employed. In the treating water phase including ion conductors, current is carried through mobility of ions. At the interface between the electrode and solution, the charge is shifted by the progress of electrode reaction. At the anode electrode, oxidation reaction occurs to cause a flow of anode current. At the cathode electrode, reduction reaction occurs to cause a flow of cathode current.

In the present invention, the electrolyte preferably includes alkali metal halide. Accordingly, the halide ions are oxidized at the anode electrode to cause generation of halogen gas. This halogen gas reacts with water in the electrolyte to produce hypohalogen acid.

For the alkali metal halide, sodium chloride is preferable. In the electrolyte solution, sodium chloride is ionized to sodium ions and chloride ions in accordance with the formula of:

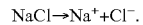

$$NaCl \rightarrow Na^+ + Cl^-.$$

The chloride ions are oxidized during electrolysis at the anode electrode in accordance with the formula of:

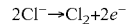

$$2Cl^- \rightarrow Cl_2 + 2e^-$$

whereby chlorine gas is generated. Then, the generated chlorine gas reacts with water in accordance with the formula of:

$$Cl_2 + H_2O \rightarrow HClO + H^+ + Cl^-$$

to generate hypochlorous acid and hydrochloric acid.

As those exhibiting an action similar to that of the alkali metal halide during electrolysis set forth above in the present invention, potassium chloride, calcium chloride ($CaCl_2$), magnesium chloride ($MgCl_2$), and the like can be used.

In the present invention, there are cases where the pharmaceutical drug may be directly oxidized at the anode electrode, or a substance other than the pharmaceutical drug oxidized at the anode electrode may react with the pharmaceutical drug to cause decomposition or alteration of at least a portion of the chemical structure of the pharmaceutical drug, whereby the pharmacological activity and/or toxicity of the pharmaceutical drug may be eliminated or reduced. Specifically, the hypohalogen acid may react with the pharmaceutical drug in the present invention to cause decomposition or alteration of at least a portion of the chemical structure of the pharmaceutical drug, whereby the pharmacological activity and/or toxicity of the pharmaceutical drug may be eliminated or reduced.

In the present invention, reaction at the cathode electrode during electrolysis is not made clear in detail. There is a possibility of the pharmaceutical drug included in the water to be treated set forth above being directly changed in chemical aspect at the cathode electrode. Although the pharmaceutical drug does not directly react with the cathode electrode, there are cases where a substance other than the pharmaceutical drug undergoing reduction reaction at the cathode electrode may react with the pharmaceutical drug in a secondary manner. The present invention also includes the case where the chemical structure of at least a portion of the chemical structure of the pharmaceutical drug may be decomposed or altered by the indirect reaction between a substance other than the pharmaceutical drug undergoing reduction reaction and the pharmaceutical drug, whereby the pharmacological activity of the pharmaceutical drug may be eliminated or reduced.

<Sterilant>

A sterilant (sterilizing agent) has cytotoxicity which kills pathogenic microbes by a contact of just a short period of time. It is to be particularly noted that a chlorine-type sterilant may possibly generate trihalomethane in the waste with the possibility of carcinogenicity. From the standpoint of protecting the environment and maintaining the order of the ecology, the sterilant must be discharged to the river with the toxicity of the sterilant removed. Such toxicity can be eliminated or reduced by virtue of the water treatment apparatus and method of the present invention.

Glutaral, for example, can be cited as a specific example of the sterilant. Glutaral has the formula of:

exhibiting high reaction with amino groups and sulfhydryl groups such as of cell walls, virus protein, and the like, or the action of protein synthesis inhibition, DNA synthesis inhibition and the like. By altering or decomposing a portion of the chemical structure of the glutaral through electrolysis in accordance with the water treatment apparatus and method of the present invention, the pharmacological activity of glutaral can be rendered inactive.

<Antibiotic>

An antibiotic is generally a chemical substance produced by microorganisms, acting on other microorganisms (microbes that becomes the cause of infection) or on biological cells to inhibit or eliminate the multiplication or function at low concentration. The antibiotic includes substances chemically synthesized, exhibiting the action set forth above. Chemically synthesized antibiotics are also called antimicrobial agents.

Although such antibiotics act on the biochemical difference in the life support mechanism present between microorganisms and the cells of homines and are not hazardous to cells of homines, it is considered to be a favorable chemotherapeutic drug from its selective toxicity such as exhibiting toxicity to cells of microorganisms.

In accordance with the usage of antibiotics, microorganisms originally sensitive to antibiotics may no longer be sensitive to the antibiotic and exhibit tolerance thereto. Also such antibiotics may be the cause of allergy, microbial substitution, and the like.

If such antibiotics exhibiting tolerance and having cytotoxicity are discharged to the river or ocean without any treatment, biological organisms (including microbes) populating the rivers and oceans will intake the antibiotic. In view of the biological organisms exhibiting such tolerance and side effects set forth above, it cannot be denied that the order of the environment and ecology will be disturbed greatly if such antibiotics are discharged to the river and ocean after just the conventional passage of the sewerage.

In the present invention, the pharmacological activity of antibiotics exhibiting the above-described action is eliminated or reduced by means of electrolysis. By discharging the waste fluid subjected to the water treatment method of the present invention before the passage of the conventional sewerage, the adverse effect on the ecology and the environment can be eliminated or reduced.

Antibiotics include various types such as penicillins, cephems, carbapenems, monobactams, amino glycosides, macrolides, tetracyclines, chloramphenicols, anti-fungi, and the like.

The action mechanism of the antibiotics set forth above differs depending upon their system. Main mechanisms are set forth below.

(1) Cell Wall Composition Inhibition

Cell wall composition inhibition inhibits composition of the mesh-like resilient cell wall formed of peptide and polysaccharide, located at the outer side of the cell membrane of a *bacillus*, destroying the cell membrane through the intracellular pressure to kill the *bacillus*. More specifically, the biosynthesis of peptide glycan constituting the cell wall is inhibited during multiplication of the cell to eliminate the cell wall, whereby bacteriolysis and disinfection are exhibited on the *bacillus*. In cell wall composition inhibition, the biosynthesis procedure of peptide glycan of the cell wall includes intracytoplasmic reaction (first stage), reaction on cell membrane (second stage), and cross linkage reaction (cross coupling by peptide chain, last stage).

(2) Cell Membrane Function Inhibition

Cell membrane function inhibition refers to irreversible coupling with ergosterol of the cell membrane to accelerate membrane permeability to cause leakage of the contents, whereby the bacteria is killed by disinfection.

(3) Protein Synthesis Inhibition

Protein synthesis inhibition inhibits protein synthesis of a *bacillus*. Specifically, ribosome associated with protein synthesis of the *bacillus* consists of two subunits differing in size by 70 S. The subunits are coupled to control the peptide transition reaction, whereby protein synthesis is inhibited.

(4) Nucleic Acid Synthesis Inhibition

Nucleic acid synthesis inhibition inhibits synthesis of folic acid as the metabolic antagonism agent of para aminobenzoic acid (PABA) to suppress multiplication of *bacilli*. PABA is the constitutional component of folic acid indispensable for metabolism of *bacilli*. Sulfa drug that is similar in structure with the PABA is made to intervene competitively to inhibit biosynthesis of folic acid.

In the present invention, at least a portion of the chemical structure constituting the antibiotic set forth above, for example at least a portion of the chemical structure constituting an antibiotic that contributes to the four inhibition action mechanisms described above is decomposed or altered by electrolysis, whereby the pharmacological activity of the antibiotic may be eliminated or reduced.

The chemical structure constituting an antibiotic that can contribute to the action mechanisms of the above (1)-(4) includes, for example: a chemical structure that can contribute to exhibiting a synthesis inhibiting action in any of the procedure of biosynthesis of peptide glycan for (1); a chemical structure that can contribute to irreversible coupling with ergosterol for (2); a chemical structure that can contribute to coupling the subunits of ribosome in the *bacillus* for (3); and a chemical structure similar to PABA for (4).

The water treatment apparatus and method of the present invention is characterized in that at least a portion of the chemical structure forming the constitutional substance associated with a chemical reaction in the action mechanism of respective antibiotics is decomposed or altered, whereby the pharmacological activity is eliminated or reduced through electrolysis.

In the present invention, a chemical structure contributing indirectly to the action mechanism of an antibiotic to provide some influence on the actions set forth above is also taken as the subject of decomposition or alteration through electrolysis in the present invention, in addition to the above-described chemical structure that can contribute directly to the action mechanism of an antibiotic. The term "indirectly" as used herein implies the case where, though not involved as a principal in the mechanism that can occur when pharmacological activity is exhibited and in the reaction at an active site, a portion of the antibiotic is formed and can contribute to at least the reaction. Therefore, if the chemical structure contributing indirectly as set forth above is decomposed or altered, the action mechanism of the antibiotic may no longer be exhibited.

An amino glycolside antibiotic mainly inhibits the process of multiplication of cell division by inhibiting protein synthesis of a *bacillus* described above in (3), and has the action mechanism of suppressing multiplication of *bacillus*. Amikacin sulfate is known as an example of such amino glycolside antibiotics. Amikacin sulfate has the following formula:

[Formula 1]

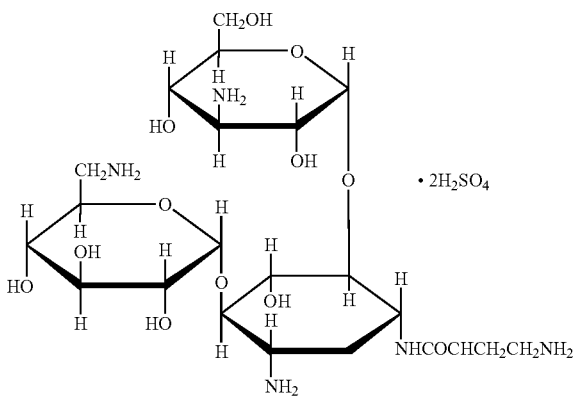

Amikacin sulfate is an antibiotic having a wide antibacterial spectrum, exhibiting intense antimicrobial activity with respect to Gram negative bacteria such as *Psedomonas aeruginosa, Myxomcetes, Serratia*, coliform *bacillus, Klebsiella*, and the like.

In the present invention, at least a portion of the chemical structure constituting amikacin sulfate may be decomposed or altered through electrolysis to eliminate or reduce the pharmacological activity of amikacin sulfate. The effect of such amikacin sulfate on the environment and ecology when discharged to the natural world can be obviated.

In the present invention, there is a possibility of the functional group characterizing the property of amikacin sulfate, for example the property of inhibiting protein synthesis, being decomposed or altered by the electrolysis in accordance with the water treatment apparatus and method of the present invention. However, this is not limited to such functional groups. Decomposition or alteration of the chemical structure of other functional groups may occur to eliminate or reduce the pharmacological activity or toxicity of amikacin sulfate.

In the case where the pharmacological activity and toxicity of amikacin sulfate are eliminated or reduced when the chemical structure is decomposed or altered by electrolysis, though not directly or indirectly contributing to the reaction set forth above, such a decomposing or altering chemical structure is also included as the subject of electrolysis in the present invention.

The amino glycoside antibiotic includes, in addition to amikacin sulfate, arbekacinsulfate, isepamicin sulfate, kanamycin sulfate, gentamicin sulfate, dibekacin sulfate, streptomycin sulfate, tobramycin, and the like. Such amino glycolside antibiotics can be subjected to electrolysis in accordance with the water treatment apparatus and method of the present invention to have the pharmacological activity eliminated or reduced.

These amino glycolside antibiotics have a common chemical structure, and a similar action mechanism of inhibiting protein synthesis. In the present invention, the advantage of the pharmacological activity or toxicity of the antibiotic, for example the activity of inhibiting protein synthesis in a *bacillus*, being eliminated or reduced as a result of at least a portion of the chemical structure constituting the amino glycolside antibiotic being decomposed or altered by electrolysis, may be common to respective antibiotics belonging to the amino glycolsides set forth above, based on the fact that the amino glycolside antibiotics set forth above have a similar action mechanism.

<Anticancer Drug>

An anticancer drug is generally an agent acting on malignant tumors such as solid cancer, leukemia, malignant lymphoma, sarcoma and the like, curing or alleviating, as well as preventing generation, of such malignant tumors. The anticancer drug includes an alkylating agent, an antimetabolite, antitumor antibiotic, plant alkaloid, platinum compound, and monoclonal antibodies.

The anticancer drug has the action mechanism set forth below. The alkylating agent, for example, has the activity of alkylating the DNA or protein, and inhibiting multiplication of the tumor cell. The antimetabolite has the action mechanism of antagonizing the metabolic pathway of the cell.

The anticancer drug has the property of inhibiting mainly DNA or RNA synthesis by the action of coupling with the DNA or cutting the DNA chain. The plant alkaloid has the property of inhibiting the mitosis of tumor cells. The platinum compound couples with the DNA to exhibit a killer cell effect.

While such anticancer drugs are favorable agents that can inhibit multiplication and generation of cancer cells by the various action mechanisms set forth above, it cannot be denied that such anticancer drugs have toxicity such as carcinogenicity, mutagenicity, teratogenicity, spermotoxicity, and the like. Such toxicity is attributed to such anticancer drugs taking advantage of the difference in the sensitivity between a normal cell and a tumor cell as well as the difference in the introduction of the medicant. It is necessary to take into account the fact that anticancer drugs affect, not only tumor cells, but also normal cells.

Thus, the toxicity of such anticancer drugs must be treated to be reduced to a level where the toxicity thereof is rendered inactive prior to the disposal of such anticancer drugs to nature. In accordance with the water treatment apparatus and method of the present invention, the anticancer drugs exhibiting toxicity set forth above has the toxicity eliminated or reduced by decomposing or altering at least a portion of the chemical structure constituting the anticancer drug through electrolysis.

In the present invention, a chemical structure contributing indirectly to the action mechanism of anticancer drugs to provide some influence on the action of the anticancer drug is taken as the subject of electrolysis in the present invention, in addition to the chemical structure set forth above contributing directly to the action mechanism of anticancer drugs. As used herein, "indirectly" is as defined previously in the description of antibiotics. Therefore, if the chemical structure contributing indirectly as set forth above is decomposed or altered, the toxicity of the anticancer drug may no longer be exhibited.

(1) Alkylating Agent

The alkylating agent has the action mechanism of inhibiting the function of the DNA and protein to inhibit multiplication of tumor cells by alkylating the nucleic acid, particularly the DNA and protein. Cyclophosphamide can be cited as an example of an alkylating agent.

Cyclophosphamide has the following formula:

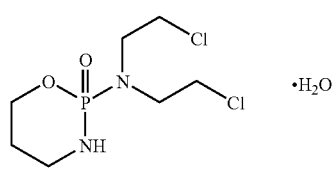

[Formula 2]

It is known that the action mechanism of cyclophosphamide inhibits nucleic acid metabolism of a malignant tumor cell after rendered active in vivo.

In accordance with the water treatment apparatus and method of the present invention, at least a portion of the chemical structure constituting cyclophosphamide may be decomposed or altered through electrolysis, whereby the toxicity of cyclophosphamide may be eliminated or reduced. The chemical structure refers to the atom or atomic group constituting cyclophosphamide, wherein at least a portion characterizing the property of cyclophosphamide is altered or decomposed. The atom or atomic group may be those that directly or indirectly contribute to the reaction in the action mechanism of cyclophosphamide. The meaning of "indirectly" is as defined previously.

In the case where the pharmacological activity and toxicity of cyclophosphamide are eliminated or reduced when the chemical structure is decomposed or altered by electrolysis, though not directly or indirectly contributing to the reaction set forth above, such a decomposing or altering chemical structure is also included as the subject of electrolysis in the present invention.

Specific examples of alkylating agents other than cyclophosphamide includes ifosfamido, dacarbazine, nitrogen mustard-N-oxide hydrochloride, nimustine hydrochloride, busulfan, merphalan, ranimustine, thiotepa, carboquone, estramustine phosphate, and the like.

These alkylating agents have a similar action mechanism of inhibiting the function of DNA and protein, and inhibiting multiplication of tumor cells by alkylating DNA and protein. In the present invention, the advantage of the toxicity of the alkylating agent being eliminated or reduced by decomposing or altering at least a portion of the chemical structure constituting the alkylating agent through electrolysis is common to respective anticancer drugs belonging to the alkylating agents set forth above, based on the fact that the alkylating agents have a similar action mechanism.

(2) Antimetabolite

The antimetabolite has the action mechanism of inhibiting nucleic acid metabolism required for the tumor cells to multiplicate, as described above. Methotrexate can be cited as an example of the antimetabolite. The formula of methotrexate is as follows:

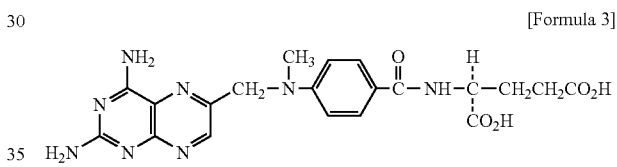

[Formula 3]

Methotrexate has the action mechanism of inhibiting the operation of DHFR that produces active folic acid required for thymiclylic acid synthesis, inhibiting synthesis of thymidylic acid and purine biosynthesis as well as cell multiplication.

In accordance with the water treatment apparatus and method of the present invention, the pharmacological activity and/or toxicity of methotrexate can be eliminated or reduced by electrolysis. By means of electrolysis, at least a portion of the chemical structure constituting methotrexate may be altered or decomposed.

The chemical structure set forth above may be a structure that contributes directly or indirectly to the reaction in the action mechanism of methotrexate having toxicity. The meaning of "indirectly" is as defined before. In the case where the pharmacological activity and toxicity of methotrexate are eliminated or reduced when the chemical structure is decomposed or altered by electrolysis, though not directly or indirectly contributing to the reaction set forth above, such a decomposing or altering chemical structure is also included as the subject of electrolysis in the present invention.

Specific examples of antimetabolites in addition to methotrexate includes enocitabine, carmofur, cytarabine, cytarabine ocfosfate, tegafur, doxifluridine, fluorouracil, hydroxycarbamide, procarbazine hydrochloride, methotrexate, mercaptopurine, tegafur.gimeracil.oteracil potassium, compounding agent, gemstabine hydrochloride, pentostadine, fludarabine phosphate, futraful.uracil compounding agent.

The advantage of the pharmacological activity or toxicity of the antimetabolite being eliminated or reduced by electrolysis is common to respective agents of the antimetabolite, based on the fact that the antimetabolite has the action mechanism of inhibiting nucleic acid metabolism required for the tumor cell to multiply.

(3) Antitumor Antibiotic

Antitumor antibiotic has an action mechanism of affinity with DNA, and inhibiting synthesis of one or both of DNA and RNA, as described above. Mytomycin C is known as an example of the antitumor antibiotic.

Mytomycin C has a formula set forth below:

[Formula 4]

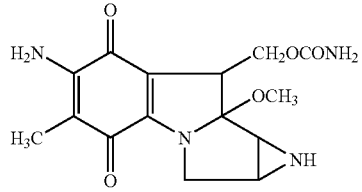

Mytomycin C has an action mechanism of coupling to the DNA of the tumor cell, inhibiting duplication of DNA via cross linkage to a double chain DNA, suppressing division of tumor cells.

Mytomycin C is an antitumor antibiotic having toxicity such as chronic toxicity, teratogenicity, carcinogenicity, and the like, and must be rendered inactive before allowing it to be discharged to nature.

In accordance with the water treatment apparatus and method of the present invention, the pharmacological activity and/or toxicity of mytomycin C can be eliminated or reduced by means of electrolysis. By electrolysis, at least a portion of the chemical structure constituting mytomycin C can be decomposed or altered.

The chemical structure set forth above may be a chemical structure contributing directly or indirectly to the reaction related to exhibition of the pharmacological activity and toxicity of mytomycin C. In the case where the pharmacological activity and toxicity of mytomycin C is eliminated or reduced when the chemical structure is decomposed or altered by electrolysis, though not directly or indirectly involved in the reaction set forth above, such a decomposing or altering chemical structure is also included as the subject of electrolysis in the present invention.

Examples of antitumor antibiotics other than mytomycin C include idarubicin hydrochloride, epirubicin hydrochloride, zinostatin stimalamer, daunorubicin hydrochloride, doxorubicin hydrochloride, pirarubicin hydrochloride, peplomycin sulfate, bleomycin hydrochloride, bleomycin sulfate, mitoxantrone hydrochloride, actinomycin D and amrubicin hydrochloride.

The antitumor antibiotics have a common chemical structure, and also a common action mechanism of inhibiting synthesis of both or one of DNA and RNA. By altering or decomposing at least a portion of the chemical structure constituting the antitumor antibiotic in the present invention, the pharmacological activity and toxicity of the antitumor antibiotic can be eliminated or reduced through electrolysis.

(4) Plant Alkaloid

As described above, plant alkaloid has the action mechanism of inhibiting mitosis of cells. Vincristine sulfate is cited as an example of the plant alkaloid.

The formula of vincristine sulfate is as follows:

[Formula 5]

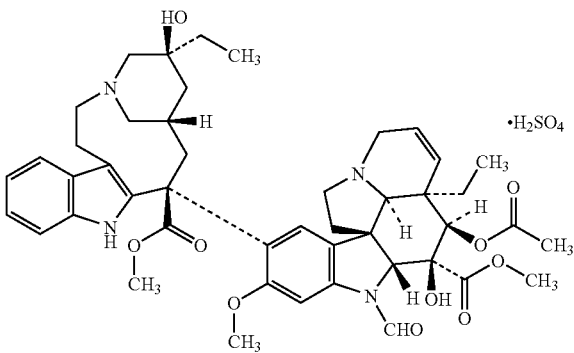

Vincristine sulfate also has the action mechanism of acting on the spindle in the metaphase of the cell's mitosis, exhibiting a typical metaphase arrest, and is known as an effective anticancer drug for leukemia, malignant lymphoma, pediatric tumor and the like. Vincristine sulfate is also known have various types of toxicity such as subacute toxicity, chronic toxicity and tetratogenicity.

In the present invention, the pharmacological activity and the toxicity of vincristine sulfate can be eliminated or reduced through electrolysis. By means of electrolysis, at least a portion of the chemical structure constituting crystalline sulfate can be decomposed or altered. The chemical structure set forth above may be a structure that contributes directly or indirectly to the action mechanism of vincristine sulfate. The meaning of the term "indirectly" is as defined before.

In the case where the pharmacological activity and toxicity of vincristine sulfate are eliminated or reduced when the chemical structure is decomposed or altered by electrolysis, though not directly or indirectly contributing to the reaction set forth above, such a decomposing or altering chemical structure is also included as the chemical structure that is electrolyzed in the present invention.

Paclitaxel is cited as another example of plant alkaloid. The formula of paclitaxel is as follows:

[Formula 6]

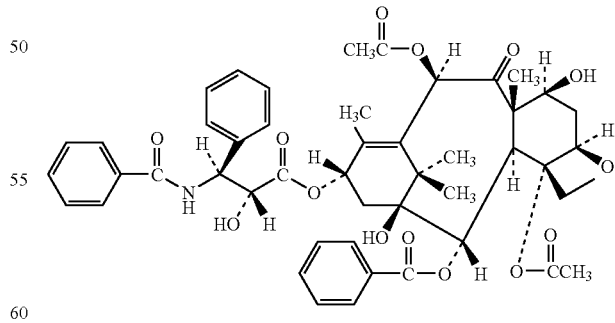

Paclitaxel is considered to have the action mechanism of promoting and stabilizing microtube organization to affect the development and function of the spindle during the cell division period (M term), exhibiting cell damage inhibiting the M term of the cell cycle. It is also known that paclitaxel has toxicity such as antigenicity, mutagenicity, local irritation, toxicity of solvents, neutrotoxicity and the like in addition to the general chronic toxicity encountered in anticancer drugs.

In accordance with the present invention, the pharmacological activity and toxicity of paclitaxel may be eliminated or reduced through electrolysis. By means of electrolysis, at least a portion of the chemical structure constituting paclitaxel can be decomposed or altered. The chemical structure set forth above may be a structure that contributes directly or indirectly to the action mechanism of paclitaxel. The meaning of "indirectly" is as defined before.

In the case where the pharmacological activity or toxicity of paclitaxel is eliminated or reduced when the chemical structure of paclitaxel is decomposed or altered by electrolysis, though not directly or indirectly contributing to the reaction set forth above, such a decomposing or altering chemical structure is also included as the chemical structure electrolyzed in the present invention.

Irinotecan hydrochloride is cited as another example of plant alkaloid. The formula of irinotecan hydrochloride is as follows:

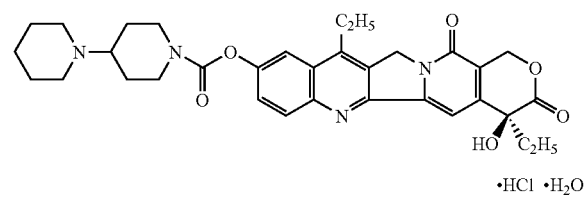

·HCl ·H$_2$O

Irinotecan hydrochloride has an action mechanism of inhibiting the DNA by inhibiting I type DNA topoisomerases (TopoI). The killer cell effect is distinctive during the S term of the cell cycle. Irinotecan hydrochloride is known as an agent effective to limited time dependency. Irinotecan hydrochloride is also known as having toxicity such as antigenicity, mutagenicity, carcinogenicity and the like in addition to the general chronic toxicity of anticancer drugs.

In accordance with the present invention, the pharmacological activity and toxicity of irinotecan hydrochloride may be eliminated or reduced through electrolysis. By means of electrolysis, at least a portion of the chemical structure constituting irinotecan hydrochloride can be decomposed or altered. The chemical structure set forth above may be a structure that contributes directly or indirectly to action mechanism of irinotecan hydrochloride. The meaning of "indirectly" is as defined before.

In the case where the pharmacological activity or toxicity of irinotecan hydrochloride is eliminated or reduced when the chemical structure is decomposed or altered by electrolysis, though not directly or indirectly contributing to the reaction set forth above, such a decomposing or altering chemical structure is also included as the chemical structure electrolyzed in the present invention.

In addition to the above vincristine sulfate, paclitaxel, and irinotecan hydrochloride set forth above, docetaxel hydrate, nogitecan hydrochloride, vinblastine sulfate, vindesine sulfate, vinorelbine ditartrate and the like can be cited.

The anticancer drugs of plant alkaloid system have a common action mechanism of inhibiting mitosis of cells. In accordance with the present invention, at least a portion of the chemical structure constituting the anticancer drugs of plant alkaloid may be decomposed or altered by electrolysis to eliminate or reduce the pharmacological activity and toxicity of such anticancer drugs, based on the fact that such anticancer drugs have the same action mechanism.

(5) Platinum Compound

Anticancer drugs belonging to platinum compounds are of a new category, formed of inorganic compounds of complex including platinum atoms. Cisplatin can be cited as an example of the anticancer drug in this category. The formula of cisplatin is as follows:

[Formula 8]

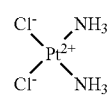

Cisplatin has an action mechanism of exhibiting a killer cell effect by coupling to the DNA, mainly including the case of forming crosslinking between the DNA base and protein, and the case of coupling to two bases of one DNA chain. Cisplatin exhibits toxicity such as mutagenicity, carcinogenicity, hemolysis, local irritation, ototoxicity, antigenicity, and the like in addition to the general chronic toxicity of anticancer drugs.

The present invention is characterized in that the pharmacological activity and toxicity of cisplatin is eliminated or reduced through electrolysis. By means of electrolysis, at least a portion of the chemical structure constituting cisplatin can be decomposed or altered. As used herein, the chemical structure set forth above may be a structure directly or indirectly contributing to the action mechanism of cisplatin. The meaning of "indirectly" is as described before.

Also, in the case where the pharmacological activity or toxicity of cisplatin is eliminated or reduced when the chemical structure is decomposed or altered by electrolysis, though not directly or indirectly contributing to the reaction set forth above, such a decomposing or altering chemical structure is also included as the chemical structure electrolyzed in the present invention.

As anticancer drugs of platinum compound other than cisplatin set forth above, nedaplatin, carboplatin can be cited. At least a portion of the chemical structure constituting such anticancer drugs may be decomposed or altered to eliminate or reduce the pharmacological activity and toxicity of such anticancer drugs, based on the fact that they have a common action mechanism.

In addition to anticancer drugs set forth above, rituximab, L-asparaginase, trastuzumab, sizofiran, and the like can be cited. By decomposing or altering at least a portion of the chemical structure thereof in accordance with the water treatment method of the present invention, the pharmacological activity of the anticancer drugs can be eliminated or reduced.

<Test>

As a method of confirming that the sterilant, antibiotic, and anticancer drug are decomposed or altered through electrolysis in accordance with the water treatment apparatus and method of the present invention, total nitrogen analysis employing gas chromatography, high performance liquid chromatography, ion chromatography, infrared-absorption-spectrum method, and flow injection method can be cited.

As a method of confirming that the pharmacological activity and/or toxicity of the sterilant, antibiotic, and anticancer drug has been eliminated or reduced by the water treatment method of the present invention, antibacterial examination, mutagenicity test, cytotoxicity examination, and the like can be employed.

<Apparatus>

An example of an apparatus applicable to the water treatment apparatus and method of the present invention is schematically shown in FIG. 1. In the water treatment apparatus of the present invention, water to be treated is introduced through an inlet 7 into a storage unit 1 storing the waste fluid. The treated water subjected to electrolysis is output from an outlet 8 of storage unit 1. Electrodes 3 and 4 are immersed in the water to be treated. The amount of water to be treated introduced through inlet 7 and the amount of waste fluid from outlet 8 can be controlled through pulse 7A and 8A, respectively.

By supplying power from direct current power supply 5 to electrodes 3 and 4 in storage unit 1, electrode 3 is established as an anode and electrode 4 is established as a cathode for execution of electrolysis of the water to be treated. Alkali metal halide is supplied into storage unit 1 via a tube 6A from a metal salt supply device 6. A mixer 2 for mixing the contents in storage unit 1 is provided in storage unit 1. Mixer 2 mixes the water to be treated in storage unit 1 during electrolysis to promote the electrolyzing process.

A method of using the apparatus set forth above will be described hereinafter. The water to be treated is introduced into storage unit 1 with valve 8A closed and valve 7A open. Valve 7A is closed when the liquid level of the water to be treated in storage unit arrives at a predetermined liquid level.

Then, alkali metal halide is supplied into storage unit 1 from metal salt supply device 6. The alkali metal halide supplied into storage unit 1 is dissolved in the water to be treated to be ionized into metal ions and halide ions.

Electrolysis is effected by conducting a current for a predetermined period of time to electrodes 3 and 4 using a power device 5. As used herein, the aforementioned "predetermined period of time" refers to a sufficient period of time required to render the pharmaceutical drug inactive pharmacologically. It is preferable to determine this period of time in advance and set this time at the apparatus in the present invention.

During electrolysis, halide ions at the anode react with the anode to generate halogen gas. This halogen gas reacts with water to produce hypohalogen acid. The hypohalogen acid reacts with the pharmaceutical drug of the present invention to decompose or eliminate at least the portion of the chemical structure constituting the pharmaceutical drug to eliminate or reduce the pharmacological activity of the pharmaceutical drug.

The reaction at the cathode is as described before. At least a portion of the chemical structure of the pharmaceutical drug in the water to be treated can be decomposed or altered to a level where the pharmacological activity is eliminated or reduced.

The electrolyzed water is delivered to the next process by opening valve 8A. The apparatus of the present invention corresponds to a primary process. In the case where the medical association set forth above is equipped with the facility of biological treatment, the output from the apparatus of the present invention is subjected to the biological treatment before the passage of the general sewerage. The general sewerage includes the treatment to satisfy the chemical oxygen demand (COD), biochemical oxygen demand (BOD) and the like. In the case where the medical association is not equipped with a secondary facility of biological treatment, the output from the apparatus of the present invention is supplied to the sewerage.

The water treatment apparatus of the present invention can reliably reduce or eliminate the pharmacological activity of the pharmaceutical drug by electrolyzing the pharmaceutical drug in the water to be treated in batches. On a batch-by-batch basis, the water to be treated in the storage unit 1 is completely exchanged for each treatment. As an alternative to the batch manner, the pharmaceutical drug may be electrolyzed in a continuous manner by operating valves 7A and 8A.

In the apparatus set forth above, the applicable electrode is formed of a material including at least Pt. An insoluble electrode is preferably employed. Specifically, an electrode having Pt attached through the well-known technique around a Ti base, an electrode formed of Pt alone, an electrode of Pt and any of Ir, Ru and Pt, and the like can be employed.

Figure 2:
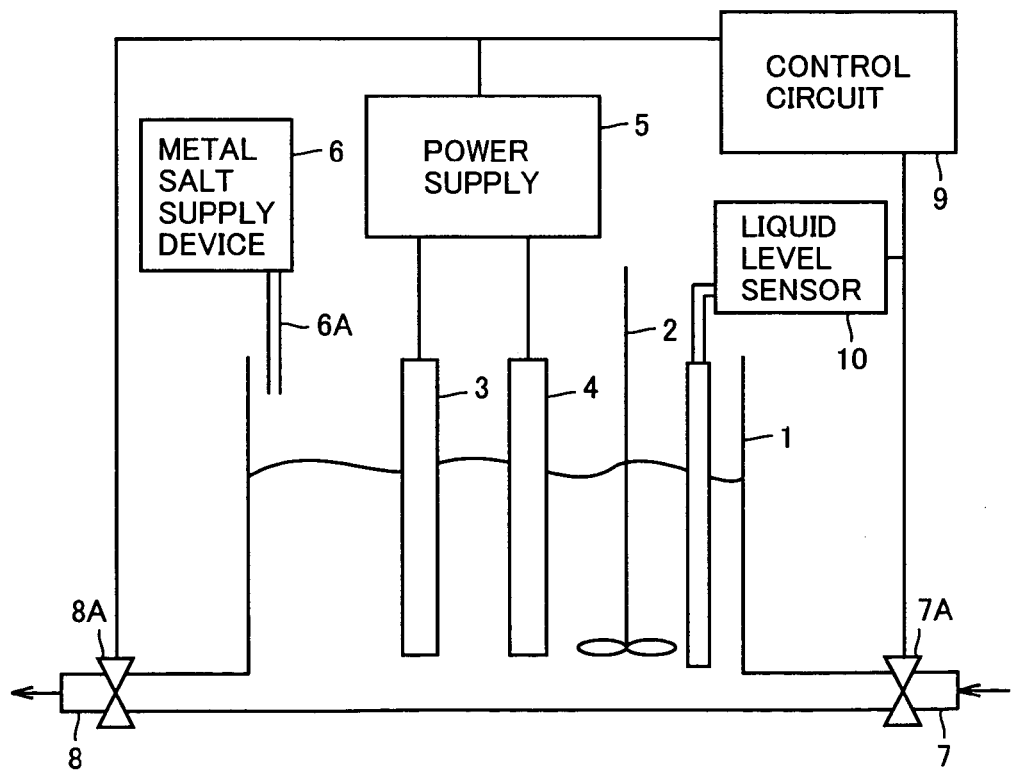
FIG. 2 is a schematic sectional view of another water treatment apparatus of the present invention.

Another apparatus applicable to the water treatment method of the present invention is shown in FIG. 2. The apparatus of FIG. 2 is a modification of the apparatus of FIG. 1, further equipped with a control circuit 9 and a liquid level sensor 10. Liquid level sensor 10 senses the height of the liquid surface (liquid level) of the waste water in storage unit 1. The sense signal is transmitted to control circuit 9. Control circuit 9 controls the opening/closing of valves 7A and 8A based on the signal transmitted from liquid level sensor 10 to adjust the amount of water flowing into storage unit 1. Control circuit 9 can control the power suitable to electrolysis, supplied to electrodes 3 and 4.

By virtue of the apparatus of FIG. 2, the amount of water to be treated flowing into storage unit 1 is regulated by control circuit 9 opening/closing valves 7A and 8A based on the signals from liquid level sensor 10. Accordingly, the water to be treated in storage unit 1 is maintained at a predetermined liquid level in storage unit 1.

Figure 3:
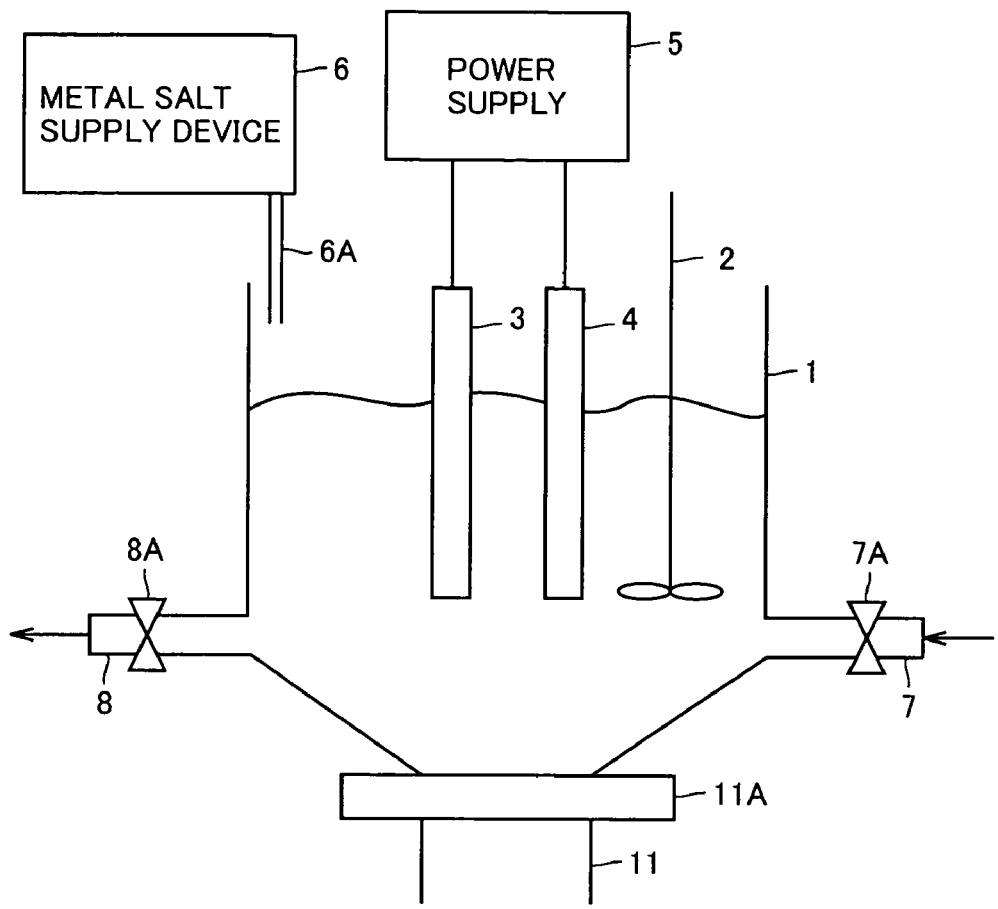
FIG. 3 is a schematic sectional view of still another water treatment apparatus of the present invention.

Still another apparatus applicable to the water treatment apparatus and method of the present invention is shown in FIG. 3. The apparatus of FIG. 3 is a modification of the apparatus of FIG. 1. Storage unit 1 has a hopper-type bottom. A drain opening 11 at the bottom is provided with a drain valve 11A.

During electrolysis, a substance other than the pharmaceutical drug included in the water to be treated or the pharmaceutical drug per se may be deposited at the bottom of storage unit 1 by the electrolytic process in the form of solid precipitates or sludge. By opening drain valve 1A after the electrolyzing process to remove such precipitates and sludge, the precipitates and sludge in storage unit 1 can be promptly and reliably drawn away from electrodes 3 and 4. This is advantageous in that the reaction on electrodes 3 and 4 will not be impeded by such precipitates or sludge.

EXAMPLES

The present invention will be described in more detail hereinafter based on examples. The following examples are to be considered as exemplary of the present invention.

Example 1

Inactivation of Sterilant by Electrolysis

1. Electrolyzer

Figure 4:
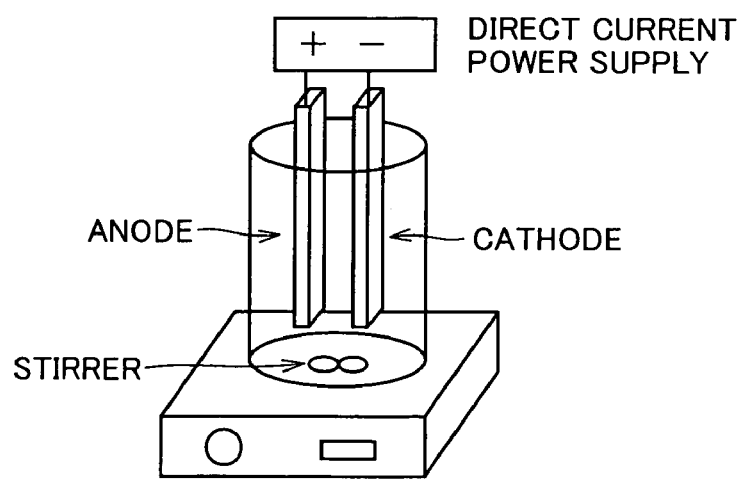
FIG. 4 schematically shows an electrolysis equipment used in testing in examples.

The apparatus of FIG. 4 was employed to confirm that the activity of the sterilant, antibiotic, and anticancer drug set forth above has been eliminated or reduced by electrolysis in the present example. FIG. 4 schematically shows an electrolytic cell employed in electrolysis. A pair of Pt electrodes is inserted in a 200 ml-container. Each electrode is connected to a direct current power supply. One and the other of the electrodes are established as an anode and a cathode, respectively. The distance between the anode and cathode is 10 mm. Each electrode has the size of 3.5×5 cm. The fluid in the container can be mixed by the rotation of a stirrer upon a magnetic field being applied by a magnetic device provided at the bottom of the container.

2. Electrolysis

A buffer agent of 0.3 ml was mixed into 2 mass % of 10 ml-Sterihide (R) (available from MARUISHI Pharmaceutical Co. Ltd.). Then, pure water was further added to set the total to 200 ml. 0.2 g of NaCl was added to this solution to prepare glutaral solution. This solution was introduced into the container of FIG. 4. Direct current was applied for six hours so as to establish the current density of 4 mA/dm$^2$. Samples of the electrolyte were taken zero, two, four and six hours from the initiation of electrolysis.

Into the electrolyte samples of respective hours was added 250 μl of 1% of sodium thiosulfate solution as a neutralizer to prepare samples with the residual chlorine and combined chlorine set to zero.

3. Electrolyzed Solution

Decomposition of glutaral was evaluated by gas chromatograph (Shimadzu Corporation GC-14A). The measurement conditions are as follows. Detector: FID; column: DB-WAX φ0.53×30 m df=1.0 μm; carrier gas: He (0.5 kf/cm$^2$), COL temperature: 170° C.; INJ temperature: 190° C.; introduced sample: 0.5 μl. The results are shown in FIGS. 5A and 5B.

Figure 5A:
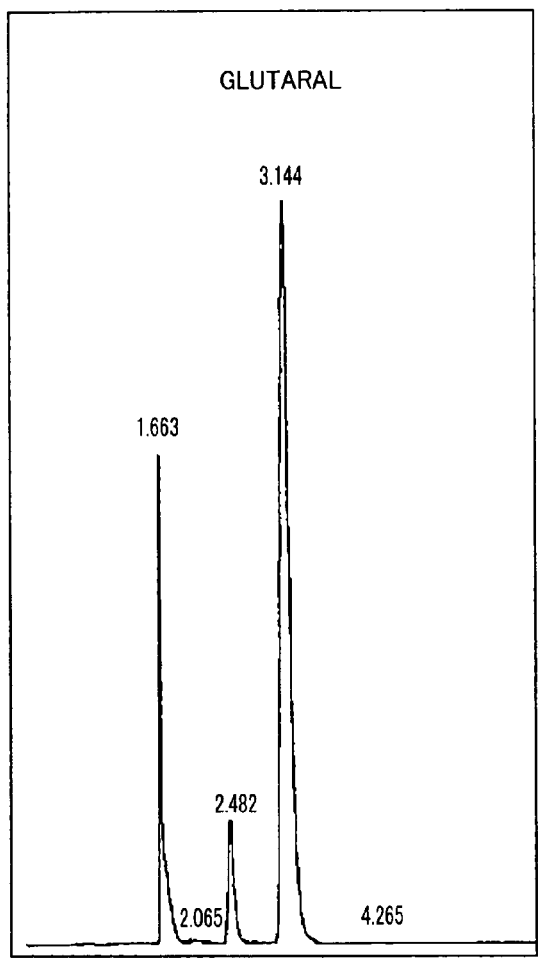
FIGS. 5A and 5B are gas chromatograph charts of glutaral, wherein the former corresponds to zero hours after initiating electrolysis and the latter corresponds to six hours after initiating electrolysis.
Figure 5B:
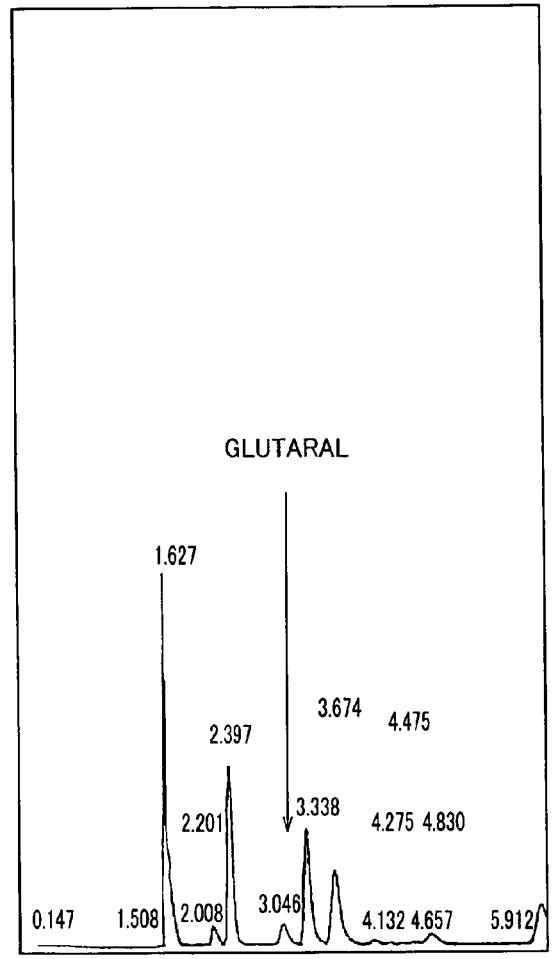

FIGS. 5A and 5B are charts of gas chromatograph of the samples taken 0 and 6 hours, respectively, from the initiation of electrolysis. In the charts, time (minutes) is plotted along the abscissa. Glutaral corresponding to 0 hours from the initiation of electrolysis, i.e. not yet electrolyzed, has a retention time (RT) of 3.14 minutes. The peak area of RT3.14 minutes was compared between the samples corresponding to 0 hours and 6 hours. The peak area of the sample taken six hours from initiation of electrolysis was 1/25 the peak area of the sample taken 0 hours from initiation of electrolysis. Four peaks, not seen before electrolysis, was identified from the chart corresponding to the sample taken 6 hours from initiation of electrolysis.

It is appreciated from the above results that glutaral is decomposed by treating glutaral in accordance with the water treatment method of the present invention.

4. Sterilizing Activity Test

The sterilizing activity of glutaral was evaluated based on MIC measurement by a small amount broth dilution method, which is the standard method of the Japanese Society of Chemotherapy. In the present example, the presence of *bacillus* by the bacterial number of survivals after a solution including *bacillus* was brought into contact with glutaral for a predetermined period of time (60 minutes) taking into account the fact that sterilization is neutralized when glutaral is mixed with the culture medium. The pharmaceutical stock solution disclosed in the standard method was replaced with the sample of the present example for testing.

4-1. Preparation of Culture Medium

As the culture medium for measuring sensitivity, Cation Supplemented Mueller-Hinton Broth: CSMHB (obtained from EIKEN CHEMICAL CO., LTD.) was used. This CSMHB was dividedly-poured 90 μl each into a U-shaped bottom 96-well microplate. This is called Plate 1.

4-2. Preparation of Samples

The samples taken 0, 2, 4 and 6 hours from initiation of electrolysis described in the above 1. were prepared. In accordance with the method of [Example 1] recited in the additional rule of the standard method, a diluted solution of sterilized phosphate buffer (PBS) was produced for each sample. In the present example, the test was carried out at ½ the scale cited in the standard method. The containing amount of glutaral in the first tube was approximately 1000 μg/ml titer. The PBS dilution was dividedly-poured 0.1 ml each into another U-shaped microplate. This is called plate 2.

4-3. Preparation of Solution including *Bacillus* and Inoculation of *Bacillus*

In the present example, *Staphylococcus aureus* (*staphylococcus* bacteria) FD209Pstrain and *Escherichia coli* (coliform *bacillus*) NIHJ JC-2 strain were employed as the bacilli for testing sensitivity.

The *bacillus* to be tested on an agar media cultured overnight was suspended to 0.5 Mc Farland (approximately $10^8$ CFU/ml) and diluted by ten times (approximately $10^7$ CFU/ml) with sterilized physiologic saline as the solution including *bacillus* for inoculation. The water to be treated and the solution including *bacillus* were inoculated and mixed 0.01 ml each in each well of Plate 1 within 15 minutes from preparation of the solution including *bacillus*. In Plate 1, a culture medium not containing the agent was poured into 1-2 wells as the control of growth of *bacillus*.

4-4. Contact and Culture

At an elapse of 60 minutes from the mixing, 10 μl of the solution of plate 2 was each introduced into the same well of Plate 1. Then, cultivation was conducted for 18 to 24 hours at 35° C.

4-5. Evaluation

The criteria of Positive Growth (+) and Inhibited Growth (−) after cultivation was determined as set forth below. Positive growth (+) was accepted when cloudiness was identified by the naked eye or a precipitate of at least 1 mm in diameter, or when two or more masses of precipitate, even though the diameter thereof is below 1 mm, was identified. Inhibited growth (−) was accepted when cloudiness by the naked eye was not identified, or when only one precipitate with a diameter below 1 mm was identified.

4-6. Results

Figure 6:
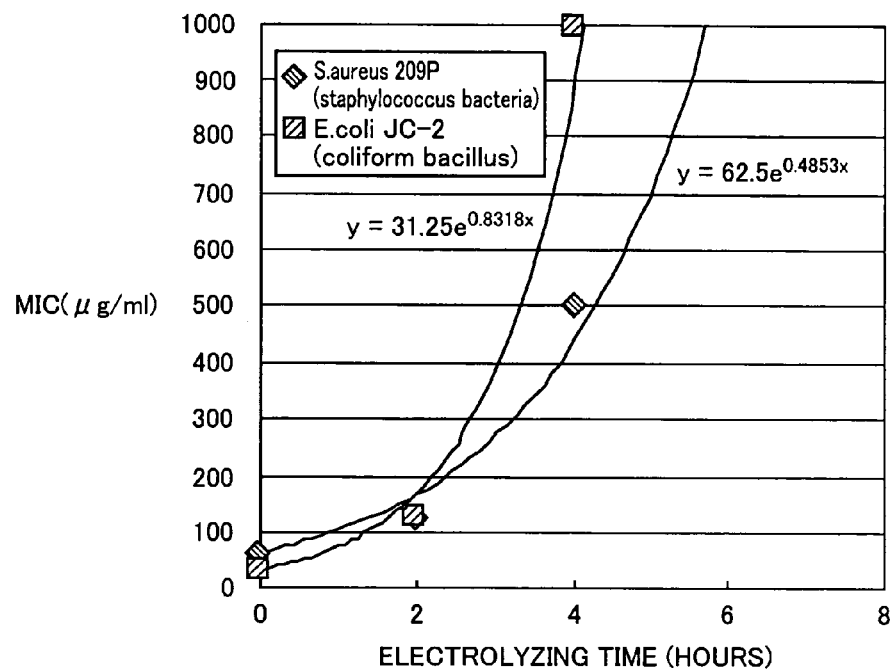
FIG. 6 is a graph representing the relationship between the electrolyzing time and the minimum inhibitory concentration of glutaral.

The results of the sterilizing activity test are shown in Tables 1 and 2 and FIG. 6. Table 1 represents the correlation between the minimum inhibitor concentration of glutaral with respect to *Staphylococcus aureus* (*staphylococcus* bacteria) and *Escherichia coli* (coliform *bacillus*) and the electrolyzing time of glutaral. Table 2 indicates the relative values of the minimum inhibitor concentration of glutaral corresponding to respective times of electrolysis with the minimum inhibitor concentration of glutaral at 0 hours from initiation of electrolysis set as 1. FIG. 6 is a graph representing the relationship between the electrolyzing time and the minimum inhibitor concentration of glutaral for the two bacilli set forth above. The electrolyzing time (hours) is plotted along the abscissa and the minimum inhibitor concentration (μg/ml) is plotted along the ordinate.

TABLE 1

| Electrolyzing time (hours) | *S. aureus* 209P (staphylococcus bacteria) | *E. coli* JC-2 (coliform bacillus) |
|---|---|---|
| 0 | 62.5 | 31.25 |
| 2 | 125 | 125 |
| 4 | 500 | >1000 |
| 6 | >1000 | >1000 |

(unit: μg/ml)

TABLE 2

| Electrolyzing time (hours) | *S. aureus* 209P (staphylococcus bacteria) | *E. coli* JC-2 (coliform bacillus) |
|---|---|---|
| 0 | 1 | 1 |
| 2 | 1/2 | 1/4 |
| 4 | 1/8 | <1/32 |
| 6 | <1/16 | <1/32 |

(when preceding electrolysis is 1)

It can be considered by the above results of sterilizing activity test that glutaral has a sterilizing action of the same level to both *Staphylococcus aureus* (*staphylococcus* bacteria) and *Escherichia coli* (coliform *bacillus*). The minimum inhibitor concentration of glutaral increases in proportion to a longer electrolyzing time. At 4 hours from initiation of electrolysis, *staphylococcus* bacteria had the minimum inhibitor concentration of 500 μg/ml and coliform *bacillus* had the minimum inhibitor concentration of >1000 μg/ml. At 6 hours from initiation of electrolysis, the minimum inhibitor concentration exceeded the maximum value that can be evaluated in the present test method (above 1000 μg/ml).

As shown in FIG. 6, the relationship between the electrolyzing time and minimum inhibitor concentration can be approximated by the following formula:

$$staphylococcus \text{ bacteria } y=62.5 \ e^{0.4853x} \quad \text{(formula 1)}$$

$$coliform \ bacillus: y=31.25 \ e^{0.8318x} \quad \text{(formula 2)}$$

where y represents the minimum inhibitor concentration (μg/ml) and x represents the time (hours) from initiating electrolysis.

The obtained minimum inhibitor concentration of *staphylococcus* bacteria and coliform *bacillus* at 6 hours from initiation of electrolysis was 1150 μg/ml and 4600 μg/ml, respectively, based on the above formulas.

It is therefore appreciated that the sterilizing activity of glutaral is reduced by the electrolytic process of the present invention. By conducting electrolysis for 6 hours or more, the minimum inhibitor concentration for the *staphylococcus* bacteria and coliform *bacillus* can be set to approximately 1/18 and approximately 1/37, respectively.

Example 2

Inactivation of Antibiotic by Electrolysis

1. Electrolyzer

An electrolyzer identical to that of Example 1 was employed in the present Example 2.

2. Electrolysis

One ample of amikacin sulfate (obtained from BANYU PHARMACEUTICAL CO. LTD., 200 mg titer, 2 ml) was mixed into 200 ml of 0.1% of NaCl solution. This mixture was introduced into the container of FIG. 4. Direct current was applied for 6 hours to establish the current density of 4 A/dm$^2$. Samples of the electrolyte were taken 0, 1, 2, 3, 5, and 6 hours from initiation of electrolysis.

Into the electrolyte samples taken at respective hours from initiation of electrolysis was added 250 μl of 1% sodium thiosulfate solution as a neutralizer to prepare samples with the residual chlorine and combined chlorine set to 0.

3. Analysis of Electrolyzed Solution

The samples of amikacin sulfate after electrolysis was evaluated by ion chromatograph (DIONEX X-120), total nitrogen analyzer (Mitsubishi Chemical Corporation TN-30) and high performance liquid chromatograph (Shimadzu Corporation). The concentration of nitrate nitrogen ($NO_3$—N), nitrite nitrogen ($NO_2$—N) and ammonia nitrogen ($NH_4$—N) in the solution were measured by ion chromatograph, focusing attention on the form of nitrogen in the solution since the chemical structure of amikacin sulfate includes an amino group.

The total nitrogen concentration (T-N) was measured using the aforementioned total nitrogen analyzer. The organic nitrogen concentration (Org-N) was obtained by subtracting nitrate nitrogen ($NO_3$—N), nitrite nitrogen ($NO_2$—N) and ammonia nitrogen ($NH_4$—N) from the total nitrogen concentration (T-N). The measurement conditions for respective analysis are set forth below.

| <Ion Chromatograph Analysis Conditions> | |
|---|---|
| Separation column: | IonPac AS4A - SC |
| Guard column: | IonPac AG4A - SC |
| Eluent: | 1.8 mM $Na_2CO_3$/1.7 mM $NaCO_3$ |
| Flow rate: | 1.2 ml/min |
| Suppresser: | ASRS - I (recycle mode) |
| Detector: | Electric conductivity detector |

<Principle of Total Nitrogen Analysis>

The flow injection method was employed in the present example. Liquid specimen (nitrogen compound of various forms set forth above) was introduced into the carrier solution (pure water) flowing continuously, then mixed with an alkali solution of potassium peroxodisulfate, and thermalized at 145° C. to obtain nitrate nitrogen. Hydrochloric acid was added to this solution for neutralization. Absorbancy was measured using an ultraviolet wave of 220 nm.

| <Liquid Chromatograph Analysis Conditions> | |
|---|---|
| Column: | Wakopac Navi C22 - 5 4.6 × 250 mm |
| Eluent: | 50 mM $NH_4PF_6$ |
| Flow rate: | 1.0 ml/min |
| Column temperature: | 40° C. |
| Detection wavelength: | UV210 nm |
| Introduced amount: | 10 μL. |

Figure 7:
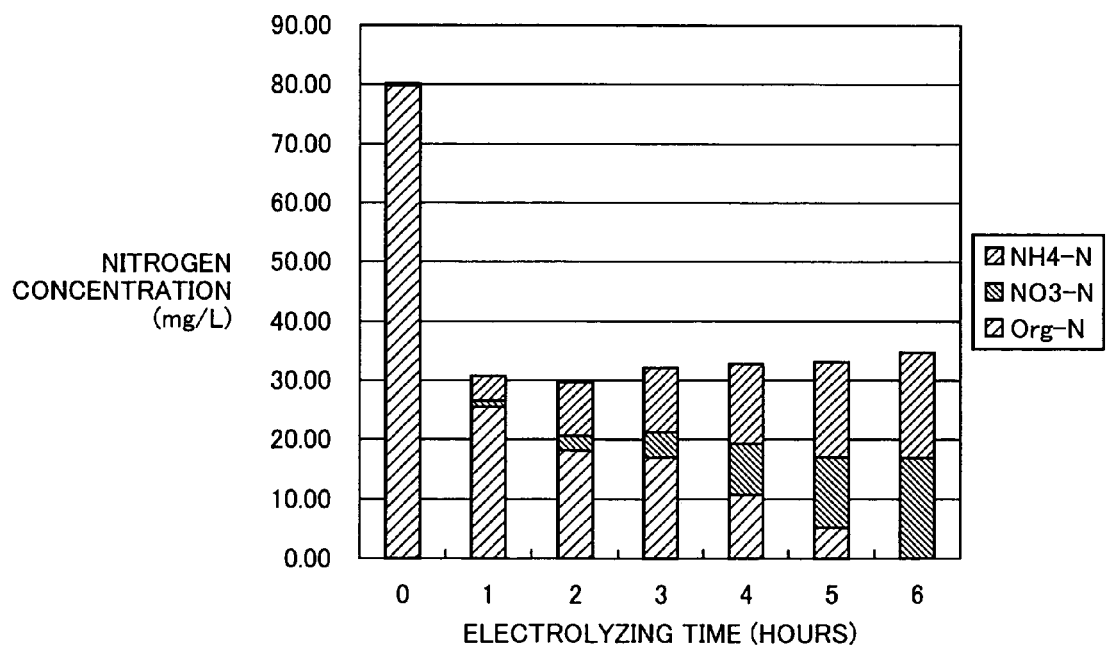
FIG. 7 is a graph representing the relationship of each nitrogen component concentration to the electrolyzing period of time of the process.

The results of total nitrogen analysis and ion chromatograph analysis of the electrolyzed solution of amikacin sulfate are shown in Table 3. The relation of each nitrogen component concentration with respect to the electrolyzing time is shown in FIG. 7. In FIG. 7, the electrolyzing time (hours) is plotted along the ordinate whereas the nitrogen concentration (mg/L) is plotted along the abscissa.

TABLE 3

| Electrolyzing time (hours) | Nitrogen Concentration (mg/L) | | | | |
|---|---|---|---|---|---|
| | NO$_3$—N | NO$_2$—N | NH$_4$—N | T-N | Org-N |
| 0 | 0.22 | 0 | 0 | 80.1 | 79.88 |
| 1 | 1 | 0 | 4.18 | 30.7 | 25.52 |
| 2 | 2.39 | 0 | 9.06 | 29.65 | 18.20 |
| 3 | 4.21 | 0 | 10.93 | 32.17 | 17.03 |
| 4 | 8.6 | 0 | 13.43 | 32.75 | 10.72 |
| 5 | 11.82 | 0 | 16 | 33.04 | 5.22 |
| 6 | 16.94 | 0 | 17.84 | 32.27 | −2.51 |

It was appreciated from the results of Table 3 and FIG. 7 that the total nitrogen (T-N) of 0 hours from initiation of electrolysis was completely organic nitrogen, i.e. the nitrogen component of amikacin sulfate. The T-N of the sample taken 1 hour from initiation of electrolysis became as low as approximately 30 mg/L. It is considered that the removed T-N component was decomposed by electrolysis to be discharged outside the system as N$_2$ gas.

The T-N value after 1 hour from initiation of electrolysis was constant at approximately 30 mg/L. As to the ratio of the nitrogen component, organic nitrogen (Org-N) was reduced whereas nitrate nitrogen and ammonia nitrogen were increased.

At 6 hours from initiation of electrolysis, all the organic nitrogen (Org-N) was substantially lost. Nitrate nitrogen (NO$_3$—N) and ammonia nitrogen (NH$_4$—N) respectively occupied approximately 50% of the total nitrogen (T-N).

It is appreciated from the results of Table 3 and FIG. 7 that the usage of the water treatment method of the present invention allows at least a portion of the chemical structure constituting an antibiotic such as amikacin sulfate to be decomposed or altered.

Figure 8A:
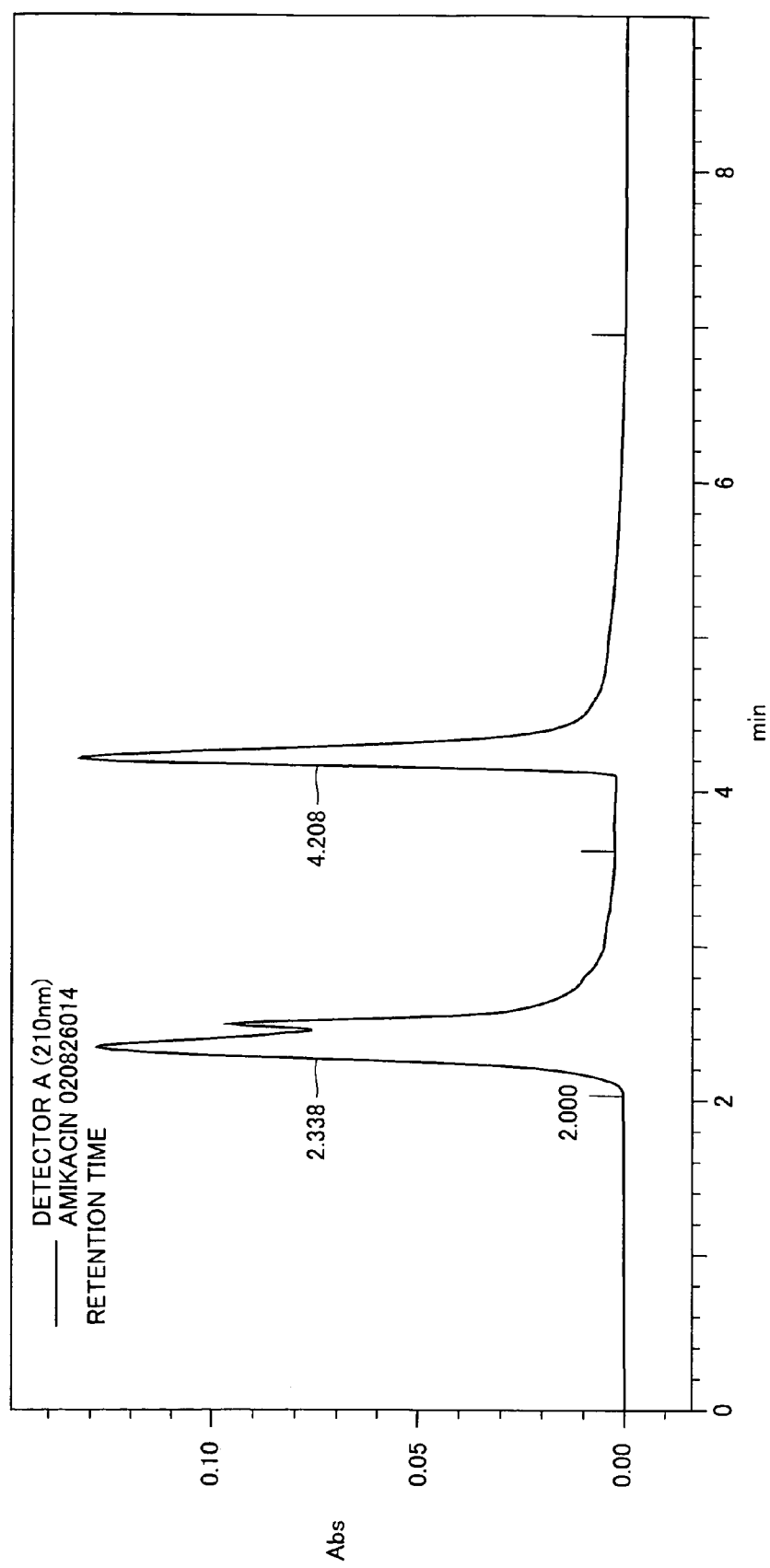

The results of analyzing the electrolytic solution using high performance liquid chromatograph are shown in Table 4. As to the concentration of amikacin sulfate in Table 4, the concentration of the liquid at 0 hours from initiation of electrolysis was taken as 1,000 mg/L, and calculated from the peak area at the retention time of 4.2 minutes. The high performance liquid chromatograph at 0 and 6 hours from initiation of electrolysis is shown in FIGS. 8A and 8B, respectively. FIGS. 8A and 8B are charts of high performance liquid chromatograph corresponding to 0 hour and 6 hours, respectively, from initiation of electrolysis.

Figure 9:
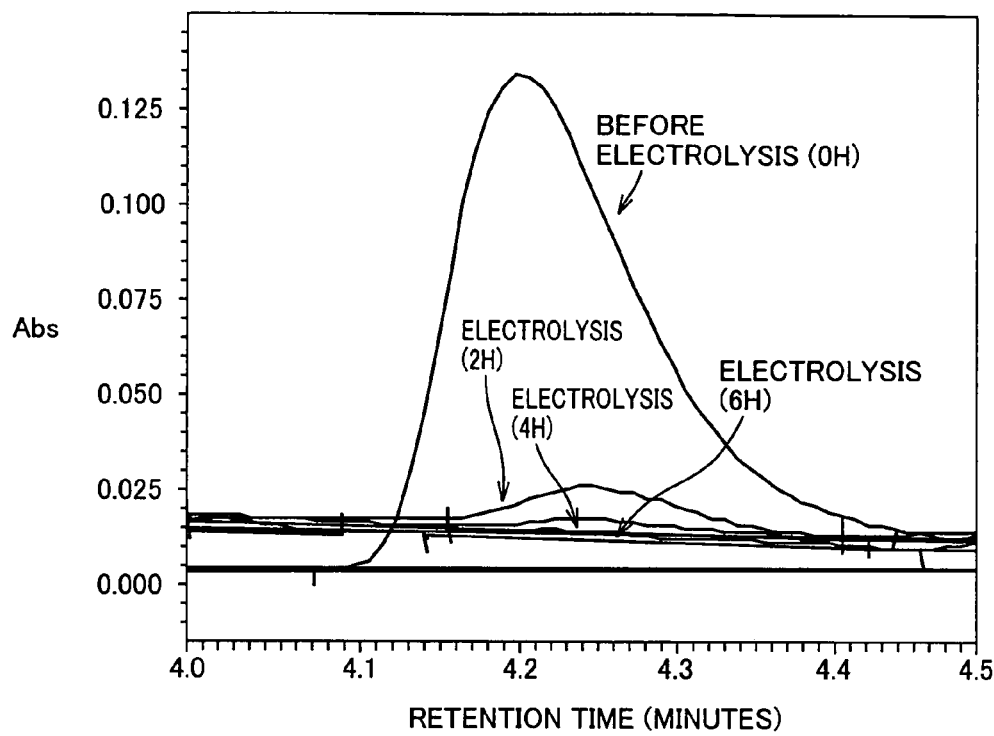
FIG. 9 is a graph representing change in the peak intensity of amikacin sulfate by electrolysis at 4.2 minutes of the retention time.
Figure 10:
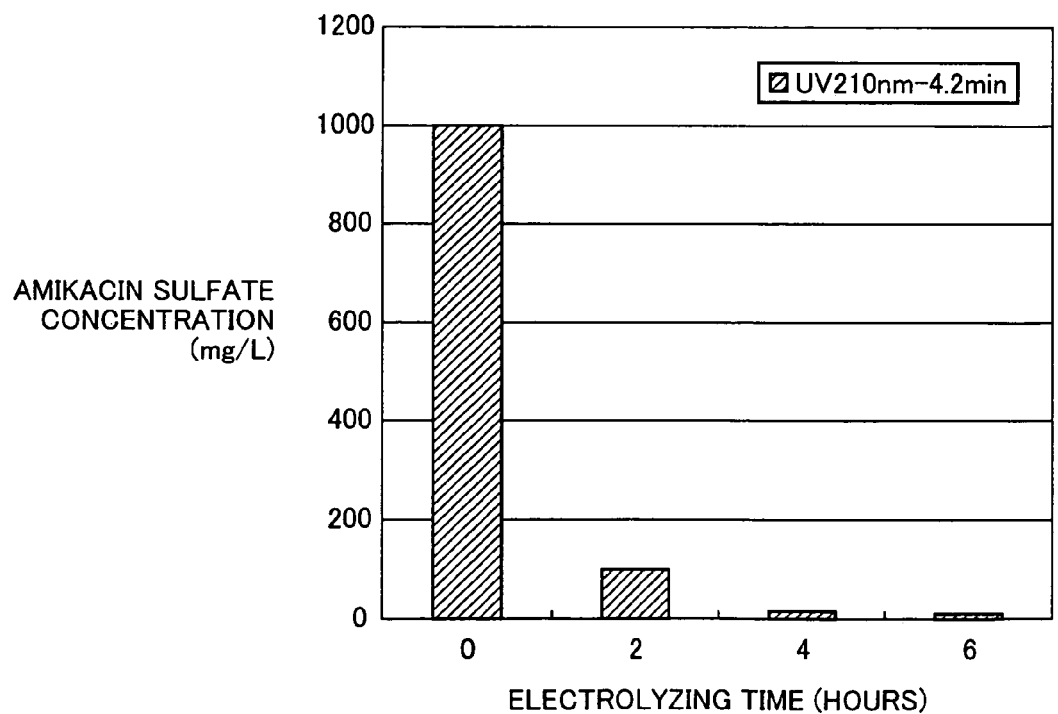
FIG. 10 is a graph representing the relationship between the electrolyzing period of time and amikacin sulfate concentration.

FIG. 9 is a chart with the peak profile of the retention time of 4.2 minutes overlapped. FIG. 10 shows the relationship between the electrolyzing time and the concentration of amikacin sulfate.

TABLE 4

| Electrolyzing time (hours) | Retention time (minutes) | Area | Concentration (mg/L) |
|---|---|---|---|
| 0 | 4.208 | 1384313 | 1000 |
| 2 | 4.251 | 136464 | 98.579 |
| 4 | 4.245 | 22030 | 15.914 |
| 6 | 4.226 | 15104 | 10.911 |

It is appreciated from the results of Table 4 and FIGS. 9 and 10 that the usage of the water treatment method of the present invention allows the chemical structure constituting amikacin sulfate to be decomposed or altered. Specifically, approximately 90% of amikacin sulfate was decomposed at 2 hours from initiation of electrolysis, and approximately 99% of amikacin sulfate was decomposed at 4 hours and thereafter from initiation of electrolysis.

4. Test of Antibacterial Activity

In accordance with the MIC measurement by a small amount broth dilution method which is the standard method of the Japanese Society of Chemotherapy, the antibacterial activity of amikacin sulfate was evaluated.

4-1. Preparation of Culture Medium

As the culture medium for measuring sensitivity, Cation Supplemented Mueller-Hinton Broth: CSMHB (obtained from EIKEN CHEMICAL CO., LTD.) was employed. This CSMHB was dividedly-poured 90 μl each into a U-shaped bottom 96-well microplate.

4-2. Preparation of Samples

Samples taken 0, 2, 4 and 6 hours from initiation of electrolysis described in the above 1. were prepared. A diluted solution was prepared in accordance with the standard method for each of these samples. The diluted solution was poured 0.1 ml each into the microplate set forth above.

4-3. Preparation of Solution Including *Bacillus* and Inoculation of *Bacillus*

The *bacilli* used in the present example are identical to the two types of *bacilli* used in Example 1, i.e. *Staphylococcus aureus* (staphylococcus bacteria) FDA 209P and *Escherichia coli* (coliform *bacillus*) NIHJ JC-2.

A solution including *bacillus* for inoculation similar to that of Example 1 was prepared. The solution including *bacillus* was inoculated approximately 0.005 ml each into each well of the plate set forth above within 15 minutes from preparation of the solution including *bacillus*. In this plate, a medium not containing the agent was poured into 1-2 wells as the control of the growth of the *bacillus*.

4-4. Contact and Culture

Cultivation was conducted for 18 to 24 hours at 35° C.

4-5. Evaluation

The evaluation method is identical to that employed in Example 1.

4-6. Results

Figure 11:
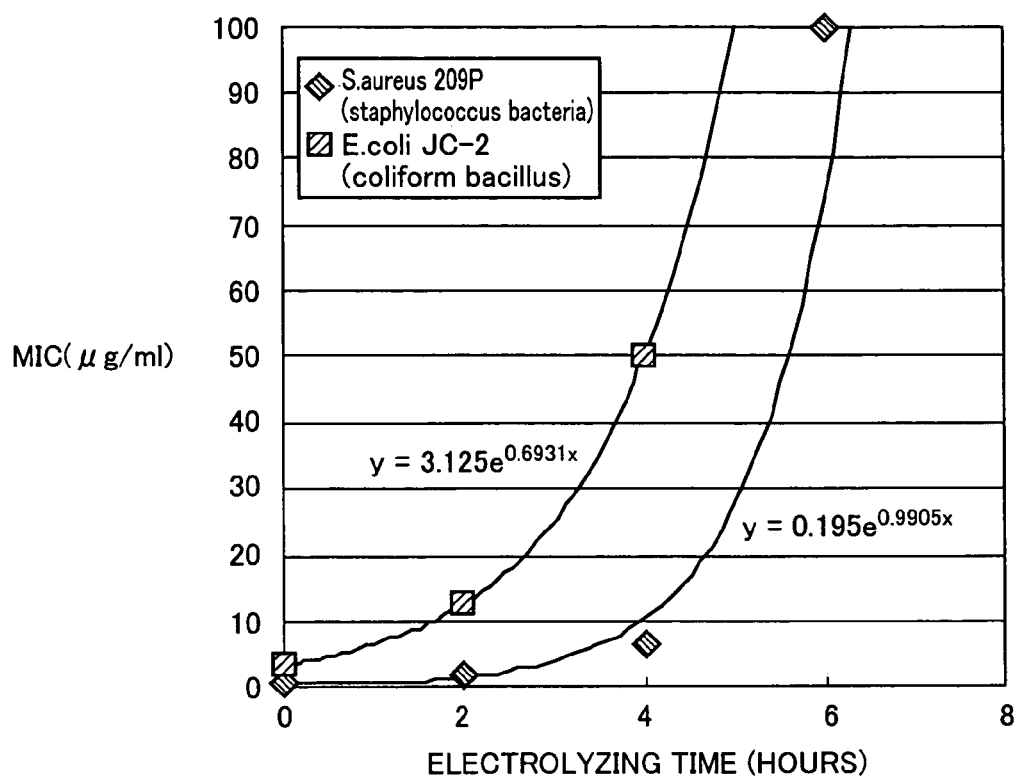
FIG. 11 is a graph representing the relationship between the electrolyzing period of time and minimum inhibitor concentration of amikacin sulfate.

The results of the test of the antibacterial activity are shown in Tables 5, 6 and FIG. 11. Table 5 represents the correlation between the minimum inhibitory concentration (MIC) of amikacin sulfate with respect to *Staphylococcus aureus* (staphylococcus bacteria) and *Escherichia coli* (coliform *bacillus*). Table 6 indicates the relative values of the MIC of amikacin sulfate corresponding to respective electrolyzing time with the MIC of amikacin sulfate at 0 hours from initiation of electrolysis set as 1. FIG. 11 is a graph representing the relationship between the electrolyzing time and the minimum inhibitory concentration of amikacin sulfate. In FIG. 11, the electrolyzing time (hours) is plotted along the abscissa and the minimum inhibitory concentration (μg/ml) is plotted along the ordinate.

TABLE 5

| Electrolyzing time (hours) | S. aureus 209P (staphylococcus bacteria) | E. coli JC-2 (coliform bacillus) |
|---|---|---|
| 0 | 0.195 | 3.125 |
| 2 | 1.56 | 12.5 |
| 4 | 6.25 | 50 |
| 6 | 100 | 664 |

(unit: μg/ml)

TABLE 6

| Electrolyzing time (hours) | S. aureus 209P (staphylococcus bacteria) | E. coli JC-2 (coliform bacillus) |
| --- | --- | --- |
| 0 | 1 | 1 |
| 2 | 1/8 | 1/4 |
| 4 | 1/32 | 1/16 |
| 6 | 1/512 | 1/212 |

(when 1 succeeding electrolysis)

It is appreciated from the above testing results of antibacterial activity that the minimum inhibitory concentration (MIC) of amikacin sulfate increases in proportion to the electrolyzing time in both Staphylococcus aureus (staphylococcus bacteria) and Escherichia coli (coliform bacillus). The MIC of staphylococcus bacteria and coliform bacillus was 100 μg/ml and >100 μg/ml, respectively, at 6 hours from initiation of electrolysis.

From FIG. 11, the relationship between the electrolyzing time and MIC can be approximated by the following formula:

staphylococcus bacteria: $y=62.5\ e^{0.4853x}$     (formula 3)

coliform bacillus: $y=31.25\ e^{0.8318x}$     (formula 4)

where y represents the MIC (μg/ml) and x represents the time (hours) from initiation of electrolysis.

The obtained MIC of coliform bacillus at 6 hours from initiation of electrolysis is 664 μg/ml, calculated based on the above formula (4) in Tables 5 and 6.

In view of the foregoing, it is appreciated that the antibacterial activity of amikacin sulfate can be reduced by the electrolytic process of the present invention. By performing electrolysis for at least 6 hours, the MIC for staphylococcus bacteria and coliform bacillus can be set to approximately 1/512 and approximately 1/212, respectively.

Example 3

Inactivation of Anticancer Drug of Antitumor Antibiotics by Electrolysis

1. Electrolyzer

The electrolyzer employed in Example 3 was substantially similar to that employed in Example 1, provided that Pt-Ir material was employed as the electrode having the size of 35×8 mm. The electrodes were set apart 5 mm from each other.

2. Electrolysis 20 mg of NaCl was added into 1 vial of epirubicin hydrochloride (using "Farmorubicin RTU injection" of KYOWA HAKKO KOGYO CO., LTD., including 10 mg titer of epirubicin hydrochloride in 1 vial (5 ml)). The mixture was introduced into the container of FIG. 4. Direct current was applied for 6 hours so that current density of 4 mA/dm$^2$ was established. Samples were taken 0, 2, 4, and 6 hours from initiation of electrolysis.

Into the electrolyte samples corresponding to respective electrolyzing hours was added 25 μl of sodium thiosulfate solution as a neutralizer to prepare samples with the residual chlorine and combined chlorine set to zero.

3. Analysis of Electrolyzed Solution

The electrolyzed samples of epirubicin hydrochloride were evaluated by high performance liquid chromatograph (Shimadzu Corporation). The high performance liquid chromatography method and measurement conditions are set forth in the following:

| <High Performance Liquid Chromatograph Analysis Conditions> | |
| --- | --- |
| Column: | ODS 4.6 × 150 mm |
| Eluent: | water + acetonitorile mixture solution (69:31, pH2) |
| Flow rate: | 1.0 ml/min |
| Column temperature: | 40° C. |
| Detection wavelength: | UV210 nm |
| Introduced amount: | 10 μL |

Figure 12:
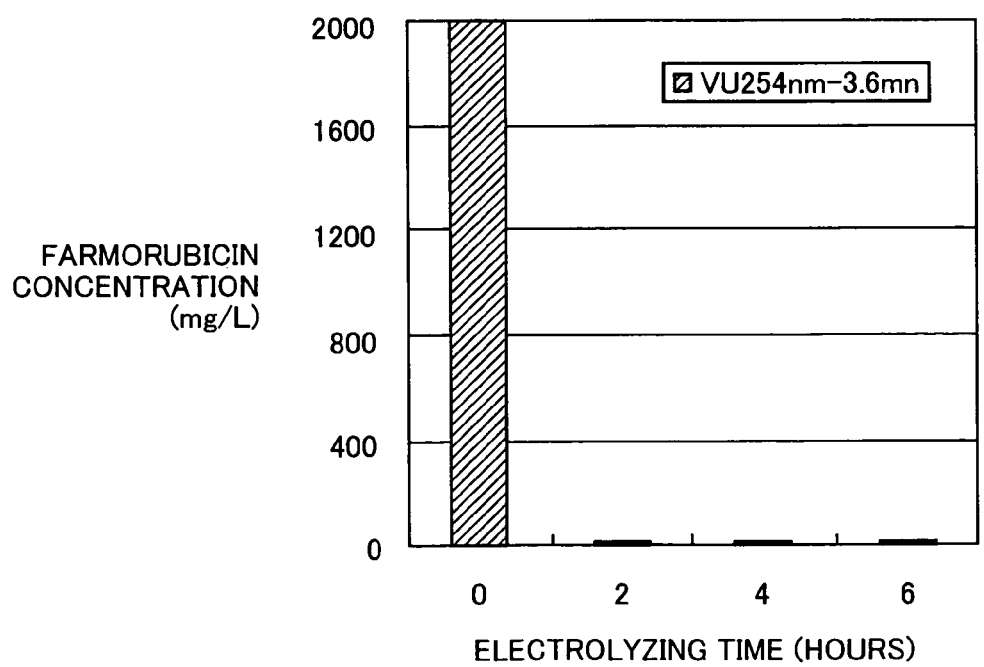
FIG. 12 is a graph representing the relationship between the electrolyzing period of time and concentration of epirubicin hydrochloride.
Figure 13A:
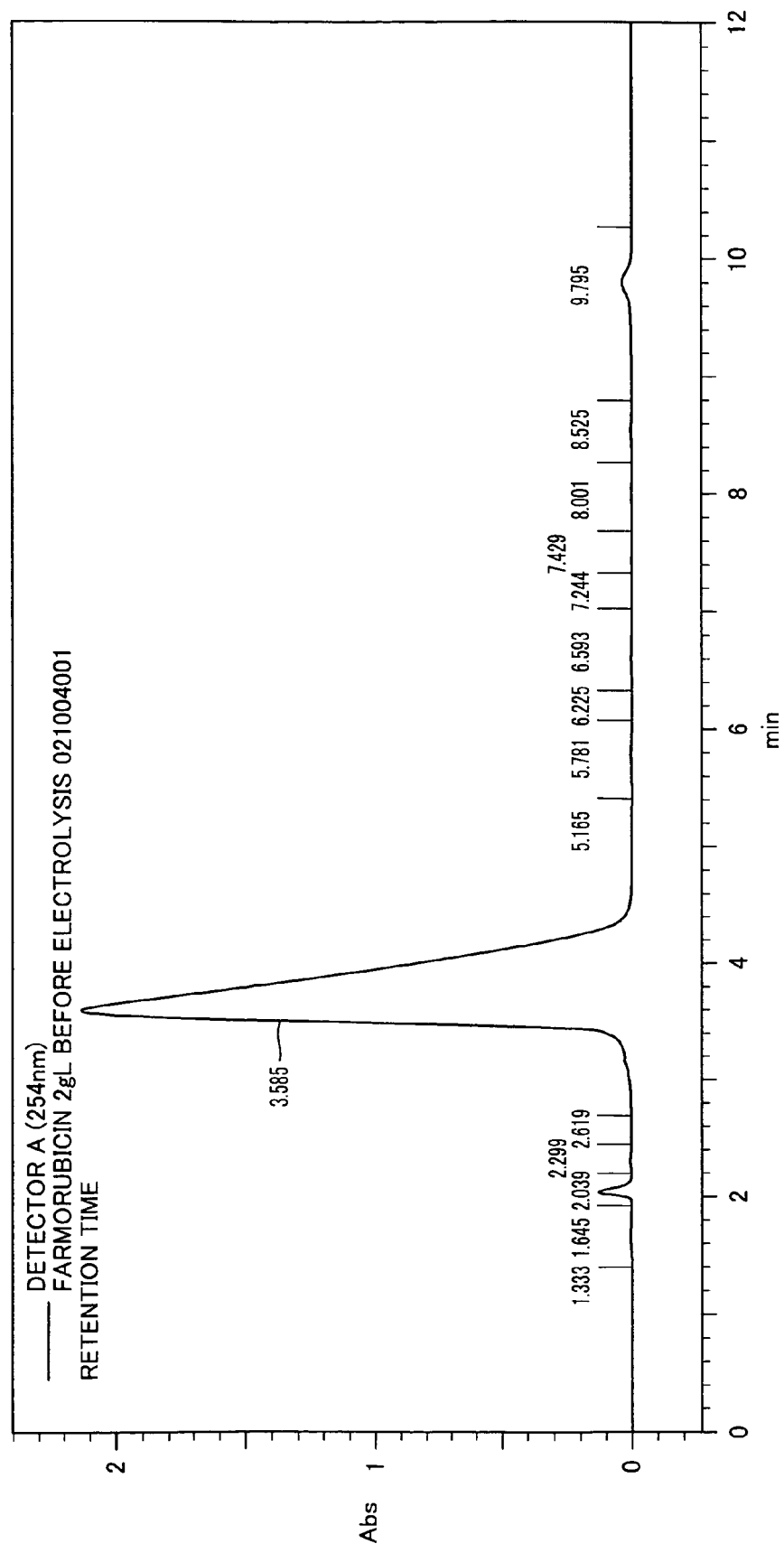
FIGS. 13A and 13B are charts of high performance liquid chromatography on epirubicin hydrochloride, wherein the former corresponds to zero hours after initiating electrolysis and the latter corresponds to six hours after initiating electrolysis.
Figure 13B:
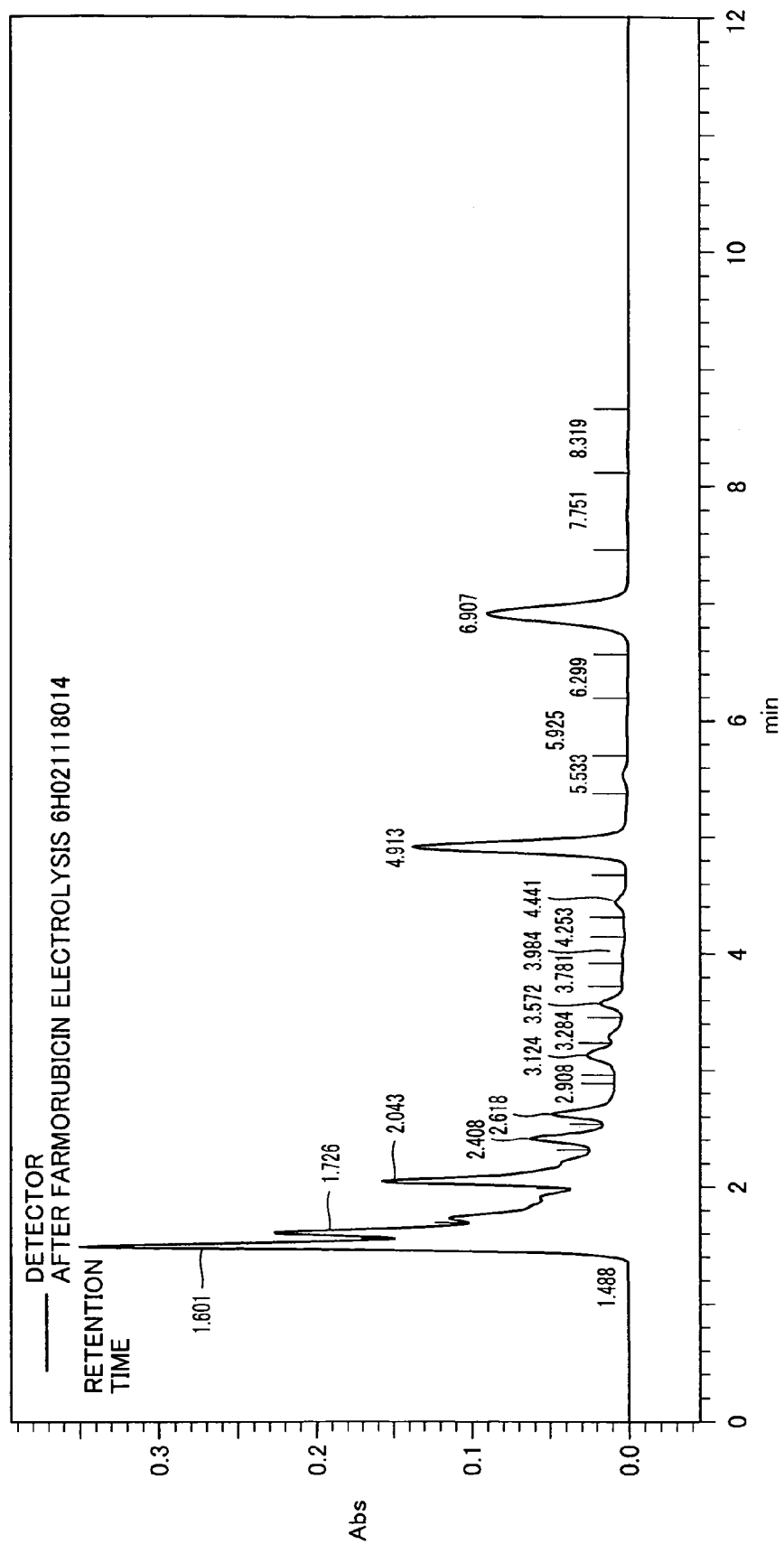

The results of analysis of the electrolytic process solution of epirubicin hydrochloride by high performance liquid chromatography are shown in Table 7. The relationship between the electrolyzing time and concentration of epirubicin hydrochloride is shown in FIG. 12. FIGS. 13A and 13B are charts of the high performance liquid chromatograph of epirubicin hydrochloride corresponding to 0 and 6 hours, respectively, from initiation of electrolysis.

TABLE 7

| Analyzing time (hours) | Retention time (minutes) | Area | Concentration (mg/L) |
| --- | --- | --- | --- |
| 0 | 3.585 | 59448173 | 2000 |
| 2 | 3.559 | 132206 | 4.45 |
| 4 | 3.567 | 171976 | 5.79 |
| 6 | 3.572 | 139749 | 4.70 |

Epirubicin hydrochloride exhibits a peak at approximately 3.6 minutes retention time (RT). In Example 3, the peak area of the sample corresponding to 0 hour from initiation of electrolysis was obtained by integration as the control. The concentration of epirubicin hydrochloride in the sample of respective electrolyzing time was calculated from the ratio of electrolyzed samples and the control sample at the peak of approximately 3.6 minutes of the retention time. The concentration $C_t$ of epirubicin hydrochloride in the sample corresponding to respective electrolyzing time can be calculated by the equation of: $C_t=C_0 \times (S_t/S_0)$, where $S_0$ is the peak area of approximately 3.6 minutes of the retention time at 0 hours from initiation of electrolysis, $S_t$ is the peak area at approximately 3.6 minutes of the retention time after electrolysis, and $C_0$ is the concentration of the sample at 0 hours from initiation of electrolysis.

It is appreciated from the above results that the chemical structure constituting epirubicin hydrochloride was decomposed or altered by the water treatment method of the present invention.

4. Test of Antibacterial Activity

The antibacterial activity of epirubicin hydrochloride was evaluated in accordance with the MIC measurement by a small amount broth dilution method, which is the standard method of the Japanese Society of Chemotherapy. The pharmaceutical stock solution disclosed in the standard method was replaced with the samples of the present example for testing.

4-1. Preparation of Culture Medium

As the culture medium for measuring sensitivity, Cation Supplemented Mueller-Hinton Broth: CSMHB (obtained from EIKEN CHEMICAL CO., LTD.) was employed. This CSMHB was poured 90 μl each into a U-shaped bottom 96-well microplate.

4-2. Preparation of Samples

Samples taken 0, 2, 4 and 6 hours from initiation of electrolysis described in the above 2 were prepared. A diluted solution of respective samples was prepared in accordance with the standard method. The diluted solution was poured 0.1 ml each into the microplate set forth above.

4-3. Preparation of Solution Including *Bacillus* and Inoculation of *Bacillus*

The *bacilli* used in the present example were identical to the two types of *bacillus* employed in Example 1, i.e. *Staphylococcus aureus* (*staphylococcus* bacteria) FDA 209P and *Escherichia coli* (coliform *bacillus*) NIHJ JC-2.

A solution including *bacillus* for inoculation was prepared in a manner similar to that of Example 1. This solution was inoculated approximately 0.005 ml in each well of the plate set forth above within 15 minutes from preparation of the solution including *bacillus*. A medium not containing the agent was poured into 1-2-wells as the control of the development of *bacillus*.

4-4. Contact and Culture

Cultivation was conducted for 18-24 hours at 35° C.

4-5. Evaluation

The evaluation method employed is similar to that of Example 1.

Figure 14:
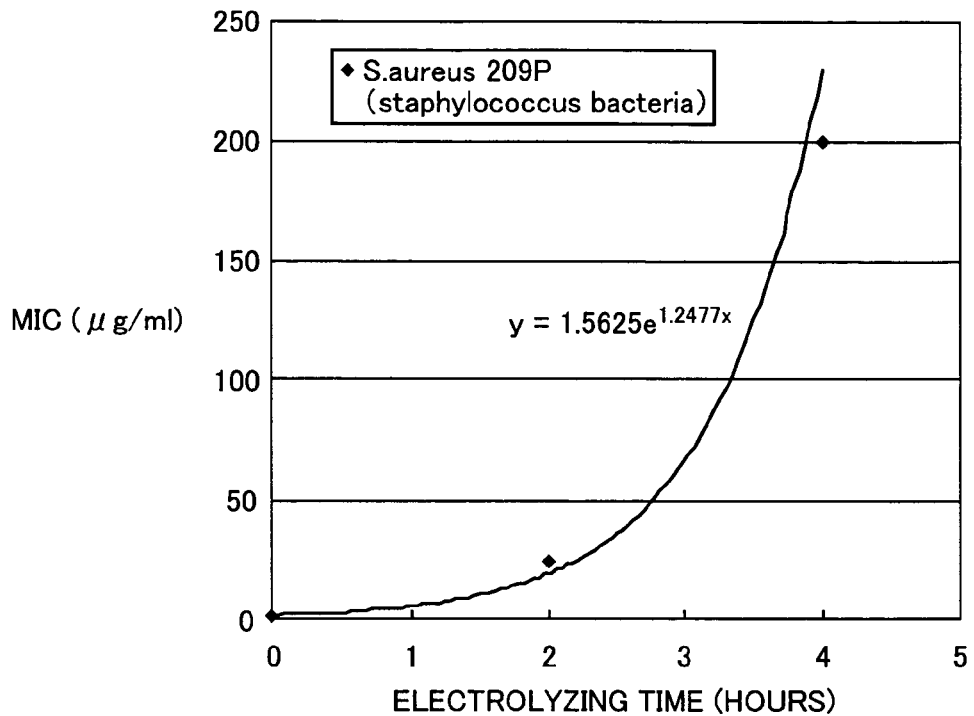
FIG. 14 is a graph representing the relationship between the electrolyzing period of time and the minimum inhibitory concentration of epirubicin hydrochloride for *Staphylococcus aureus*.

The results of the test of antibacterial activity are shown in Tables 8 and 9 and FIG. 14. Table 8 represents the correlation between the minimum inhibitory concentration (MIC) and the electrolyzing time of epirubicin hydrochloride with respect to *Staphylococcus aureus* (*staphylococcus* bacteria) and *Escherichia coli* (coliform *bacillus*). Table 9 indicates the relative MIC values of epirubicin hydrochloride corresponding to respective electrolyzing time with the MIC of epirubicin hydrochloride with respect to *staphylococcus* bacteria at 0 hour from initiation of electrolysis set as 1. FIG. 14 is a graph representing the relationship between the electrolyzing time and the minimum inhibitory concentration of epirubicin hydrochloride with respect to *staphylococcus* bacteria. In FIG. 14, the electrolyzing time (hours) is plotted along the abscissa whereas the minimum inhibitory concentration (μg/ml) is plotted along the abscissa.

TABLE 8

| Electrolyzing time (hours) | S. aureus 209P (staphylococcus bacteria) | E. coli JC-2 (coliform bacillus) |
| --- | --- | --- |
| 0 | 1.5625 | >200 |
| 2 | 25 | >200 |
| 4 | >200 | >200 |
| 6 | >200 | >200 |

(unit: μg/ml)

TABLE 9

| Electrolyzing time (hours) | S. aureus 209P (staphylococcus bacteria) | E. coli JC-2 (coliform bacillus) |
| --- | --- | --- |
| 0 | 1 | — |
| 2 | 1/16 | — |
| 4 | <1/128 | — |
| 6 | <1/128 | — |

(when 1 succeeding electrolysis)

In general, antibacterial activity is not expected for epirubicin hydrochloride which is an anticancer drug of the antitumor antibiotics. However, it became apparent from the above results of antibacterial activity that it exhibits antibacterial activity on *staphylococcus* bacteria. No antibacterial activity was recognized for coliform *bacillus*.

It was appreciated from the results of the tests of antibacterial activity that the minimum inhibitory concentration (MIC) of epirubicin hydrochloride with respect to *staphylococcus* bacteria increases in proportion to the electrolyzing time. The MIC exceeded 200 μg/ml for the *staphylococcus* bacteria at the electrolyzing time of 4 hours, exceeding the range that can be measured in the present example.

From FIG. 14, the relationship between the electrolyzing time and MIC can be approximated by the following formula:

$$staphylococcus\ \text{bacteria}: y = 1.5625\ e^{1.2477x} \quad \text{(formula 5)}$$

where y represents the MIC (μg/ml), and x represents the electrolyzing time (hours).

In view of the foregoing, it was appreciated that the antibacterial activity of epirubicin hydrochloride was reduced by the electrolysis of the present invention.

5. Cytotoxicity (CC50) Test 5-1.

In the present example, the cytotoxicity (CC50) was measured using a MOLT-4 cell which is a human lymphocyte established cell to test the cytotoxicity of epirubicin hydrochloride. For the measurement of the number of cells, tetrazolium salt WST-8 (Cell Counting Kit-8 available as a kit) was employed as the chromophone.

The basic principle of the cytotoxicity (CC50) test is set forth below. WST-8 is reduced by intracellular dehydrogenation enzyme to produce soluble formazan. Since the number of cells and the amount of generated formazan is linearly proportional, the number of cells can be readily measured by directly measuring the absorbancy of formazan at 450 nm. The specific procedure for measurement is set forth below.

5-2. Procedure

180 μl of a culture medium was introduced into each of the wells in the range of rows A-D and columns 3-10 in a 96-well flat microtiter plate for diluting the agent. 240 μl of the sample taken at 0 hours from initiation of electrolysis was added to the well of row A, column 2 in the microtiter plate. 240 μl of the sample taken 2 hours from initiation of electrolysis was added to the well of row B, column 2. 240 μl of the sample taken 4 hours from initiation of electrolysis was added to the well of row C, column 2. 240 μl of the sample taken 6 hours from initiation of electrolysis was added to the well of row D, column 2.

To produce respective columns of sample dilutions, samples of 60 μl each was taken from the above-described samples of 240 μl. These samples of 60 μl were sequentially added to the right side well to be sufficiently pipeted. This was conducted up to column 10. Two of U-bottom 96-well microtiter plates for cultivation were prepared, and 200 μl of PBS was applied to all the side-most wells. 100 μl of culture medium was introduced into each of the wells of rows B-G, columns 2-9. 150 μl of culture medium was introduced into the wells of columns 10 and 11. Then, 50 μl of cell suspension solution prepared to $5 \times 10^6$ cell/ml was introduced into each of the wells of rows B-G, columns 2-9 and column 11. The wells of column 10 were absent of cells.

Then, 50 μl of the above-described sample dilution was introduced, into each of the wells of rows B-G, columns 2-10, every three rows for one line to be sufficiently pipeted.

These two U-bottom 96-well microtiter plates for cultivation were introduced into a $CO_2$ incubator of 5% $CO_2$ concentration to be cultured for three days.

10 μl of WST-8 solution each was introduced into two flat 96-well microtiter plates. Each well of the U-bottom microtiter plate subjected to cultivation was pipeted sufficiently. 100 μl each was introduced and pipeted sufficiently Reaction was conducted for one hour in a $CO_2$ incubator. Then, the O.D. was measured at 450 nm and 620 nm using a microplate reader.

5-3. Results

Figure 15:
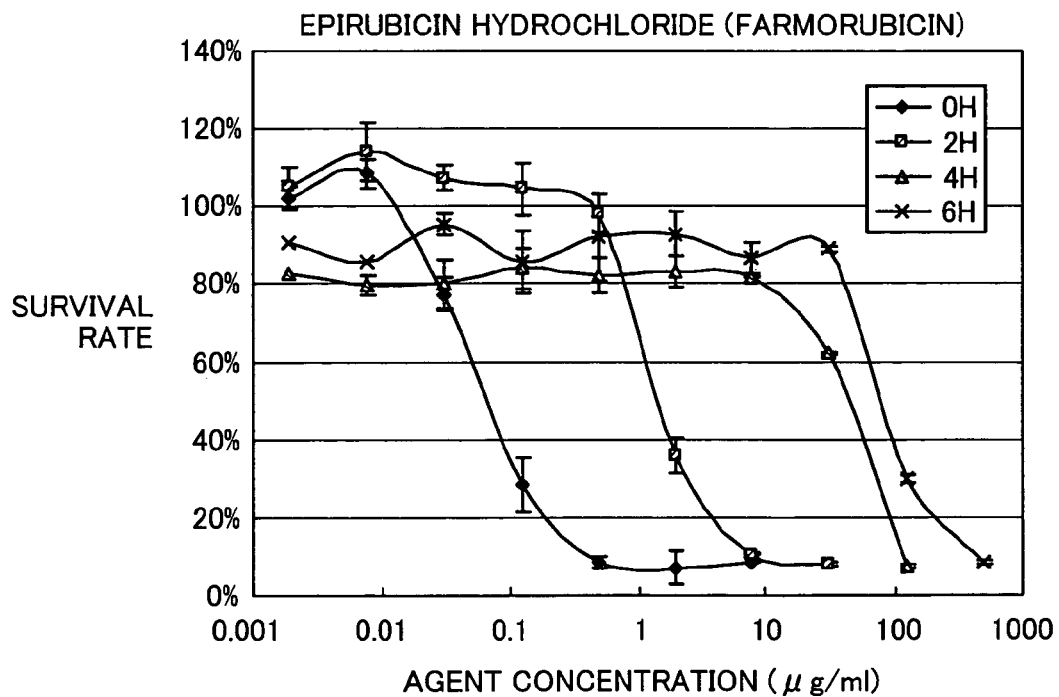
FIG. 15 is a graph representing the relationship between the concentration of epirubicin hydrochloride at respective periods of time after initiating electrolysis and survival rate of Molt-4 cells.

FIG. 15 shows the relationship between the concentration of epirubicin hydrochloride taken at respective times from initiation of electrolysis and the survival rate of Molt-4 cells. It is appreciated from FIG. 15 that the survival rate of the Molt-4 cells depends upon the concentration of epirubicin hydrochloride. At 0 hours from initiation of electrolysis, there was change in the survival rate of the Molt-4 cells in the epirubicin hydrochloride concentration range of approximately 0.01 to 1 (μg/ml). Similarly, there was change in the survival rate of the Molt-4 cells in a predetermined epirubicin hydrochloride concentration range at 2, 4, and 6 hours from initiation of electrolysis.

Figure 16:
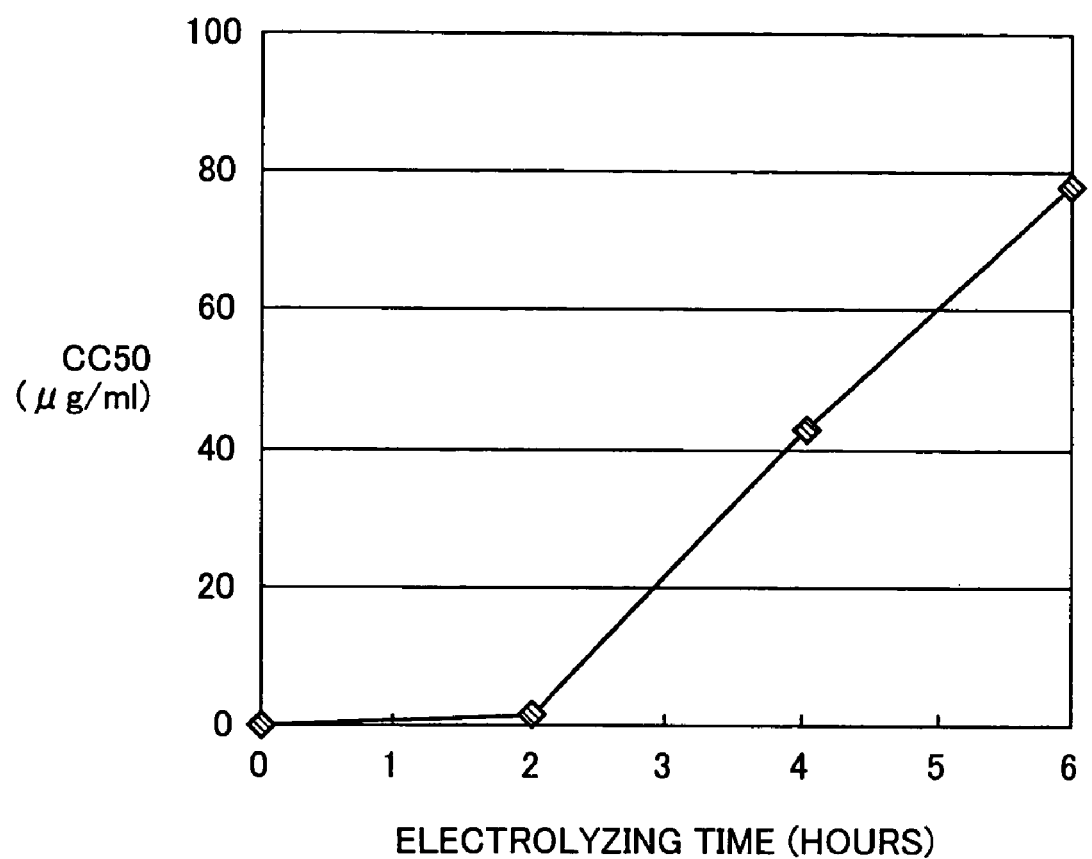
FIG. 16 is a graph representing the change in CC50 of epirubicin hydrochloride with respect to electrolysis.
Figure 17A:
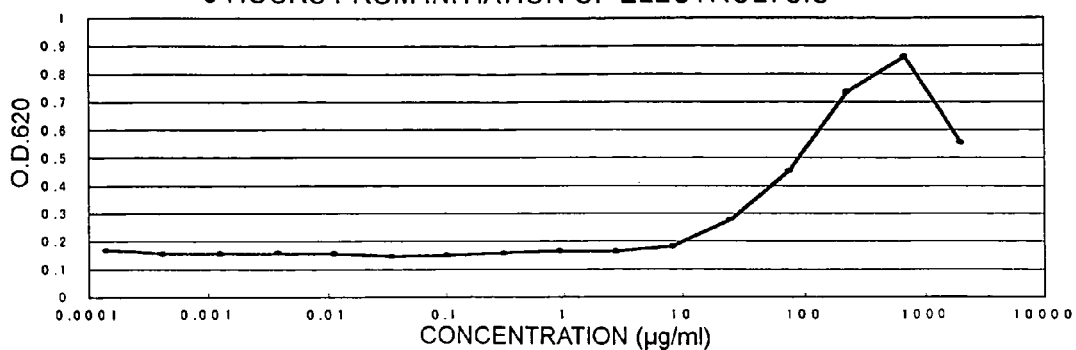
FIGS. 17A, 17B, 17C, and 17D are graphs representing the results of the umu-test on epirubicin hydrochloride after initiating electrolysis.
Figure 17B:
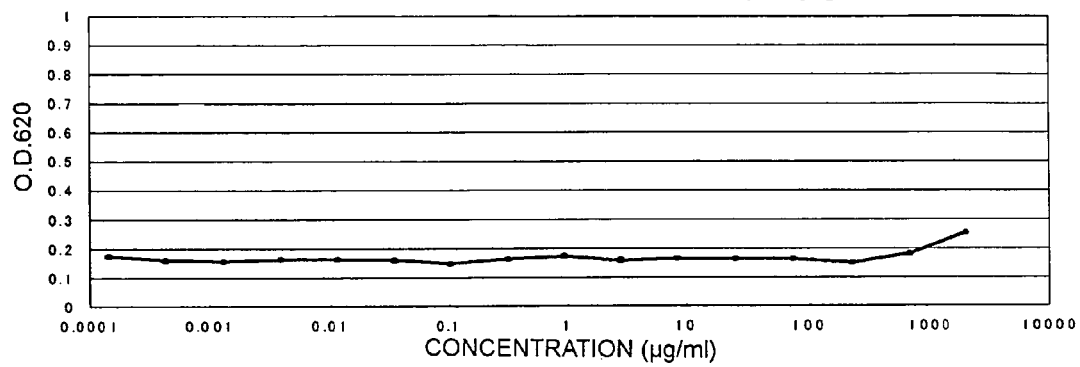
Figure 17C:
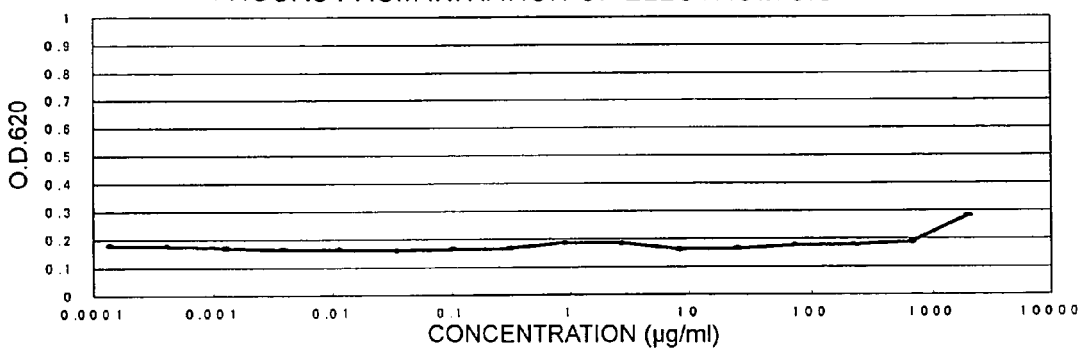
Figure 17D:
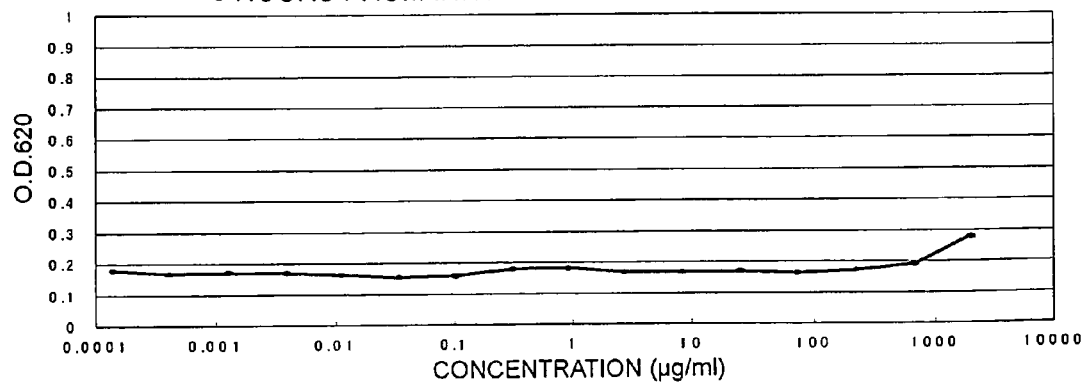
Figure 18:
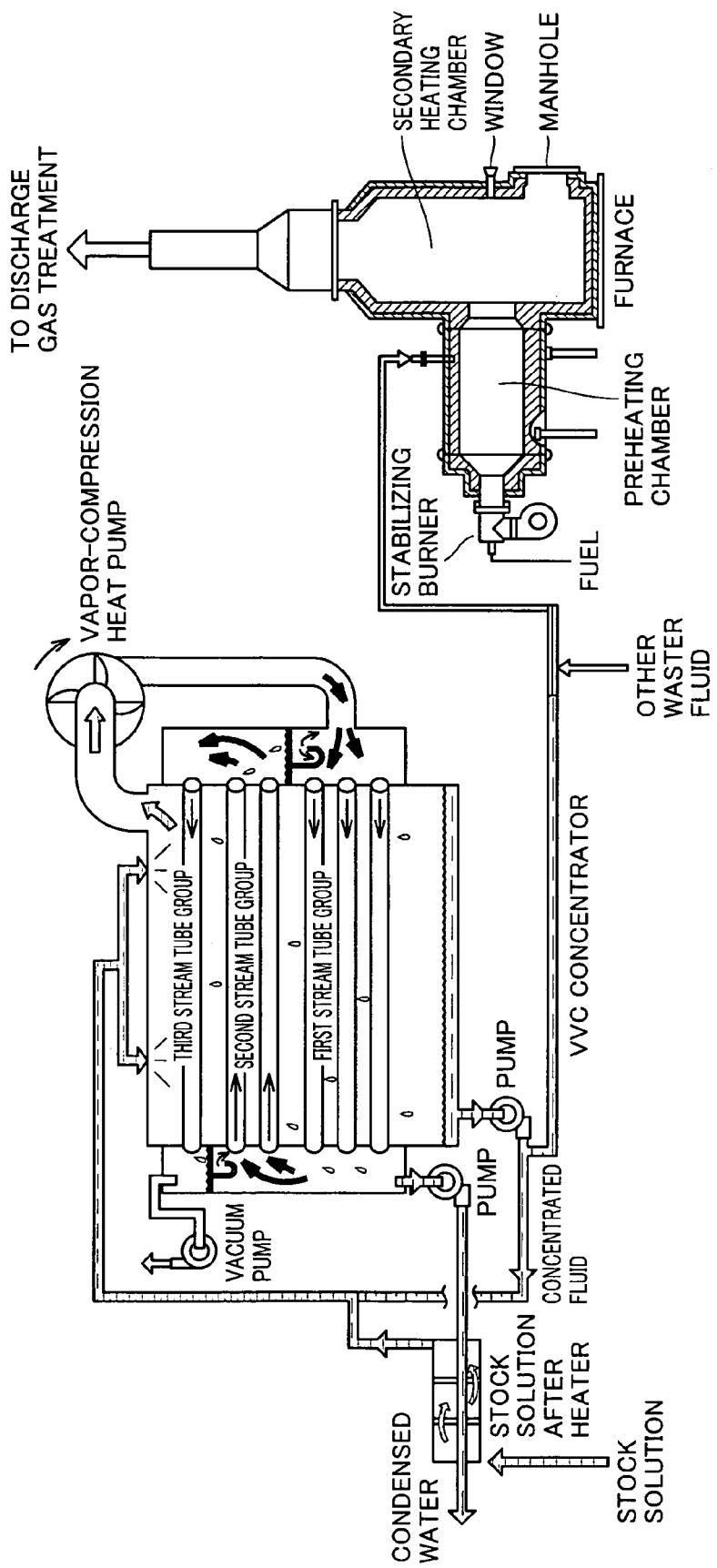
FIG. 18 schematically shows an incineration process of medical waste liquid.

The epirubicin hydrochloride concentration CC50 (agent concentration of 50% cell survival) exhibiting the survival rate of 50% for Molt-4 cells was obtained in the region with concentration dependency. Table 10 represents the CC50 to Molt-4 cells for the epirubicin hydrochloride concentration at respective time from initiation of electrolysis. The CC50 is represented in the graph in FIG. 16. In FIG. 16, the electrolyzing time (hours) is plotted along the abscissa whereas CC50 (10 μ/ml) is plotted along the ordinate.

TABLE 10

| Electrolyzing time (hours) | CC50 (μg/ml) |
|---|---|
| 0 | 0.066 |
| 2 | 1.43 |
| 4 | 42.49 |
| 6 | 78.02 |

It is appreciated from Table 10 and FIG. 16 that the CC50 of epirubicin hydrochloride increases in proportion to a longer electrolyzing time. Thus, it is apparent that cytotoxicity is reduced. It was identified that CC50 increases in proportion to the electrolyzing time at the elapse of 2 hours from initiation of electrolysis. In the present example, hypochlorous acid and sodium thiosulfate exhibited almost no contribution to cytotoxicity.

It is therefore appreciated that the toxicity of epirubicin hydrochloride that is the anticancer drug of antitumor antibiotic has been reduced by the electrolysis in accordance with the water treatment method of the present invention.

6. Mutagenicity Test 6-1.

In the present example, the presence of mutagenicity of epirubicin hydrochloride at respective hours from initiation of electrolysis and the relationship between the concentration of epirubicin hydrochloride and mutagenicity induction level was tested.

6-2. Procedure

The test was conducted according to the instruction manual included in the kit of "Umu-test" from Japan Immunoresearch Laboratories Co., Ltd.

6-3. Results

The results of the umu-test (measured at O.D.620 nm) corresponding to 0, 2, 4, 6 hours from initiation of electrolysis of epirubicin hydrochloride are shown in FIGS. 17A to 17D. The "cut off value" that is the break point in determining the positivity and negativity based on the absorbancy of CD620 nm was approximately 0.18 when m+2SD, where m is the average of the absorbancy when the agent is not added and SD is the standard deviation. In view of this value, epirubicin hydrochloride exhibited positivity at all of 0, 2, 4 and 6 hours from initiation of electrolysis since the first tube exceeded 0.2.

The mutagenicity induction level at the fifth tube (24.7 μ/ml) at 0 hours from initiation of electrolysis was shifted to the first tube (2000 μg/ml) at 2, 4, and 6 hours from initiation of electrolysis. Since the umu-test of the present example was carried out at lines diluted by three times, the mutagenicity of epirubicin hydrochloride by the electrolytic process was reduced to $1/3^4=1/81$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A water treatment method comprising:
   applying water to be treated, including a pharmaceutical drug of at least one of a sterilant, anticancer drug, and antibiotic, into storage means storing water to be treated;
   applying current to a pair of electrodes for electrolysis of said water to be treated to decompose or alter at least a portion of a chemical structure of said pharmaceutical drug in said water to be treated applied into said storage means for eliminating or reducing at least one of a bactericidal action, disinfection, carcinogenicity, cytotoxicity, mutagenicity, teratogenicity, spermatoxicity, and antibacterial activity of said pharmaceutical drug; and
   separating solid precipitates and sludge generated by electrolysis of said pharmaceutical drug or a substance other than the pharmaceutical drug included in said water to be treated from said pair of electrodes by removing solid precipitates and sludge from said storage means,
   wherein said water to be treated includes halide ions;
   said step of applying water to be treated includes the step of adjusting an amount of said water to be treated applied to said storage means by controlling opening/closure of an inlet valve through which the water to be treated that flows into said storage means passes and an output valve through which the water discharged from said storage means passes; and
   in said step of separating solid precipitates and sludge, said solid precipitates and sludge are removed by opening a drain valve with which a drain opening at the bottom of said storage means is provided.

2. The water treatment method according to claim 1, further comprising:
   adding into said water to be treated metal salt generating halide ions when dissolved in said water to be treated.

3. The water treatment method according to claim 2, wherein said metal salt includes sodium chloride.

4. The water treatment method according to claim 1, further comprising the step of mixing said water to be treated when said water to be treated is subject to electrolysis.

5. The water treatment method according to claim 1, wherein said pair of electrodes is formed of a material including at least platinum.

* * * * *